United States Patent
Mehta

(10) Patent No.: US 8,959,558 B2
(45) Date of Patent: Feb. 17, 2015

(54) USER-BASED MEDIA CONTENT CHAPTERING SYSTEMS AND METHODS

(75) Inventor: Japan A. Mehta, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 785 days.

(21) Appl. No.: 12/495,458

(22) Filed: Jun. 30, 2009

(65) Prior Publication Data

US 2010/0333123 A1 Dec. 30, 2010

(51) Int. Cl.
| | |
|---|---|
| *H04N 7/173* | (2011.01) |
| *H04H 60/73* | (2008.01) |
| *H04H 60/37* | (2008.01) |
| *H04N 21/258* | (2011.01) |
| *H04N 21/4147* | (2011.01) |
| *H04N 21/442* | (2011.01) |
| *H04N 21/4788* | (2011.01) |
| *H04N 21/658* | (2011.01) |
| *H04N 21/845* | (2011.01) |

(52) U.S. Cl.
CPC ............ *H04H 60/73* (2013.01); *H04H 60/37* (2013.01); *H04N 21/25891* (2013.01); *H04N 21/4147* (2013.01); *H04N 21/44222* (2013.01); *H04N 21/4788* (2013.01); *H04N 21/6582* (2013.01); *H04N 21/8456* (2013.01)
USPC ............................................ 725/87; 725/131

(58) Field of Classification Search
None
See application file for complete search history.

(56) References Cited

U.S. PATENT DOCUMENTS

| | | | |
|---|---|---|---|
| 7,363,649 B2 | 4/2008 | Marsh | |
| 7,694,225 B1* | 4/2010 | Weber et al. .................. | 715/723 |
| 2003/0074662 A1 | 4/2003 | Istvan et al. | |
| 2003/0093790 A1 | 5/2003 | Logan et al. | |
| 2005/0166258 A1* | 7/2005 | Vasilevsky et al. ............ | 725/138 |
| 2006/0204220 A1* | 9/2006 | Lee ................................. | 386/95 |
| 2006/0265657 A1* | 11/2006 | Gilley ........................... | 715/730 |
| 2007/0101394 A1 | 5/2007 | Fu et al. | |
| 2007/0118873 A1 | 5/2007 | Houh et al. | |
| 2008/0016540 A1 | 1/2008 | Savoor et al. | |
| 2008/0092168 A1* | 4/2008 | Logan et al. .................... | 725/44 |

* cited by examiner

*Primary Examiner* — Mark D Featherstone

(57) ABSTRACT

An exemplary method includes providing, by a media content access subsystem, a media content program for presentation to a user, receiving user input with the media content access subsystem, capturing, by the media content access subsystem, a snapshot image of the media content program based on the user input, associating, by the media content access subsystem, metadata with the snapshot image, and transmitting, by the media content access subsystem, data representative of the snapshot image and the metadata to a media content chaptering subsystem for use by the media content chaptering subsystem in chaptering the media content program. Corresponding methods and systems are also disclosed.

20 Claims, 17 Drawing Sheets

USER-BASED MEDIA CONTENT CHAPTERING SYSTEMS AND METHODS

BACKGROUND INFORMATION

The advent of set-top boxes and other media content access devices has provided users of such devices with access to a large number and variety of media content programs, services, and choices. For example, a user may choose to experience a variety of broadcast television programs, pay-per-view services, video-on-demand programming, Internet services, and audio programming via a set-top box.

The large number of media content choices available to users of set-top boxes can be daunting. Conventional tools such as on-screen menu guides and program guides have been provided to assist users in searching for, accessing, recording, and otherwise managing desired media content. However, there remains room to improve such tools. For example, conventional media content access devices lack capabilities for user-based and community-based chaptering of media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
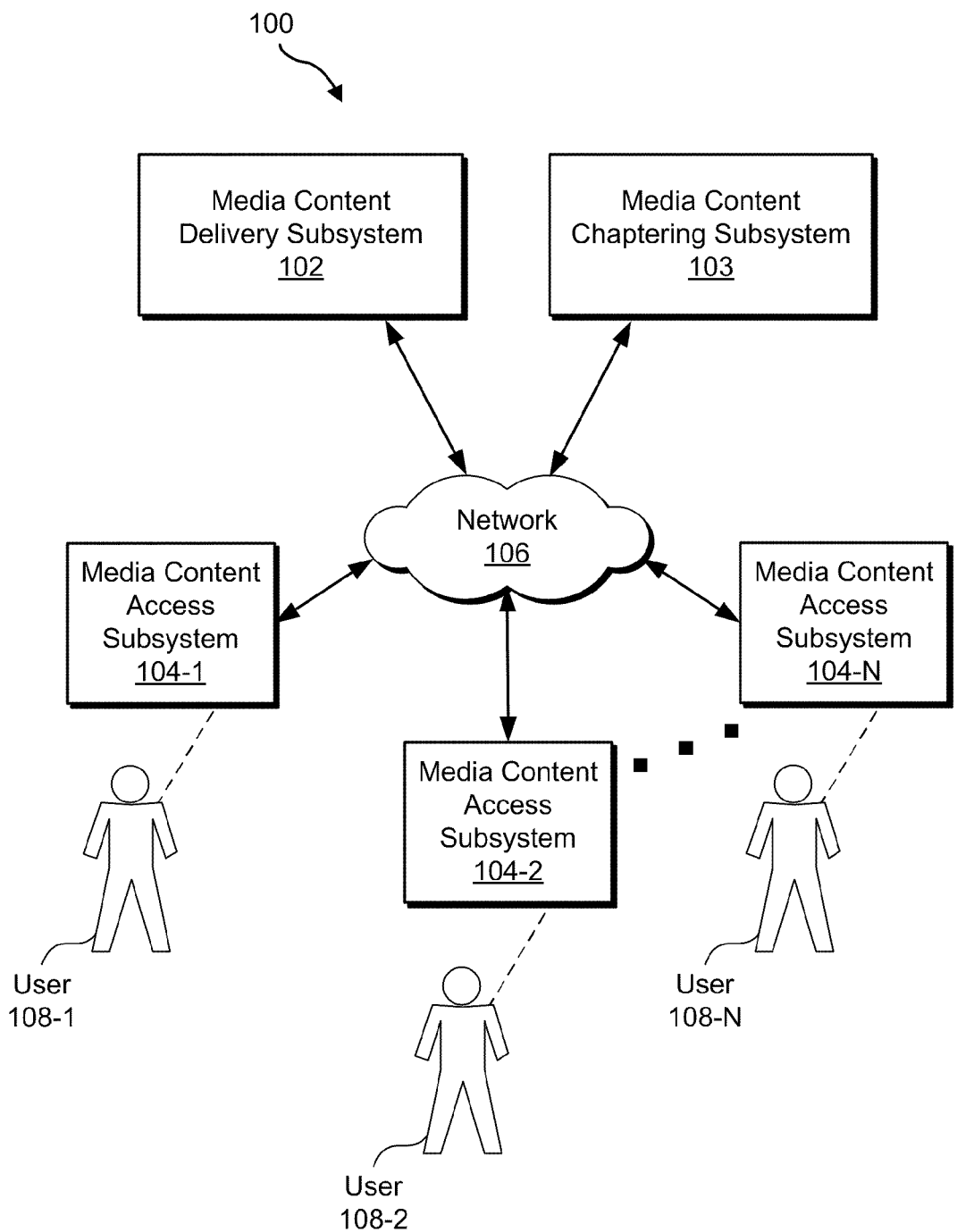
FIG. 1 illustrates an exemplary media content delivery and chaptering system.

Exemplary user-based media content chaptering systems and methods are described herein. As described in more detail below, one or more media content access subsystems may capture media content chaptering data provided by one or more users of the media content access subsystems and provide the chaptering data to a media content chaptering subsystem. The media content chaptering subsystem may selectively publish the chaptering data to one or more media content access subsystems, which may utilize the chaptering data for segment-based processing of the media content. Accordingly, a user of a particular media content access subsystem may be able to provide media content chaptering data and access media content chaptering data provided by one or more other users of one or more other media content access subsystems. The user of the particular media content access subsystem may utilize the accessed media content chaptering data for segment-based processing of media content, such as initiating playback of a media content program from a position within the media content program based on user-provided chaptering data. In certain embodiments, user-based chaptering data may include one or more user-provided snapshot images of one or more media content programs and metadata associated with the snapshot images.

For example, an exemplary method includes providing, by a media content access subsystem, a media content program for presentation to a user, receiving user input with the media content access subsystem, capturing, by the media content access subsystem, a snapshot image of the media content program based on the user input, associating, by the media content access subsystem, metadata with the snapshot image, and transmitting, by the media content access subsystem, data representative of the snapshot image and the metadata to a media content chaptering subsystem for use by the media content chaptering subsystem in chaptering the media content program.

As used herein, the term "media content" may refer generally to any content that may be accessed and/or presented by a media content access subsystem for experiencing by a user of the media content access subsystem. The term "media content program" as used herein may refer generally to any television program, on-demand media program, pay-per-view media program, broadcast media program (e.g., broadcast television program), multicast media program, narrowcast media program, IPTV program, video program, streamed media program, or any other form of video content that may be accessed and/or presented by the media content access subsystem for viewing by a user.

As used herein, the term "media content chaptering" (or simply "chaptering") may refer generally to one or more processes and/or operations related to identifying or indexing one or more segments of a media content program, maintaining and providing data representative of the identified segments, and/or utilizing the identified segments for segment-based processing of media content. Segment-based processing of media content may include performance of one or more operations on media content by segment. For example, a user may be able to utilize chaptering data to navigate a media content program by segment (i.e., chapter).

Exemplary user-based media content chaptering systems and methods will now be described with reference to the accompanying drawings.

FIG. 1 illustrates an exemplary media content delivery and chaptering system 100 (or simply "system 100"). System 100 may include a media content delivery subsystem 102 (or simply "delivery subsystem 102"), a media content chaptering subsystem 103 (or simply "chaptering subsystem 103"), and one or more media content access subsystems 104 (e.g., media content access subsystems 104-1 through 104-N) in communication with one another via a network 106.

While an exemplary media content delivery and chaptering system 100 is shown in FIG. 1, the configuration of system 100 illustrated in FIG. 1 is not intended to be limiting. Additional or alternative configurations may be used in other embodiments. In certain alternative embodiments, for example, delivery subsystem 102 and chaptering subsystem 103 may be integrated together and/or may be configured to communicate directly without going through network 106.

Media content access subsystems 104 (or simply "access subsystems 104") may be configured to communicate with and receive one or more media content streams containing data representative of and/or associated with media content from delivery subsystem 102. In addition, access subsystems 104 may be configured to communicate with chaptering subsystem 103, including providing and receiving media content chaptering data for one or more media content programs to/from chaptering subsystem 103. As used herein, the term "media content chaptering data" (or simply "chaptering data") may refer generally to any data related to chaptering of media content, including any data useful for identifying one or more segments of a media content program and/or for segment-based processing of the media content program. Examples of media content chaptering data are described further below.

Access subsystems 104 may be associated with one or more users, which in certain embodiments may be subscribers to or end users of one or more services (e.g., a media content delivery service and/or a content chaptering service) provided over network 106. As an example, FIG. 1 shows users 108-1, 108-2, and 108-N (collectively "users 108") as being associated with subsystems 104-1, 104-2, and 104-N, respectively. The exemplary users 108 and their particular associations with access subsystems 104 are shown for illustrative purposes. Other user associations with access subsystems 104 may be defined in system 100.

In certain embodiments, system 100 or one or more components of system 100 may include any computer hardware and/or computer-implemented instructions (e.g., software), or combinations of computer-implemented instructions and hardware, configured to perform one or more of the processes described herein. In particular, it should be understood that components of system 100 may be implemented on one physical computing device or may be implemented on more than one physical computing device. Accordingly, components of system 100 may include any one of a number of computing devices, and may employ any of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Delivery subsystem 102, chaptering subsystem 103, and access subsystems 104 may communicate using any suitable communication technologies, devices, networks, media, and protocols supportive of remote data communications. For example, delivery subsystem 102, chaptering subsystem 103, and access subsystems 104 may communicate over network 106 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 106 may include one or more networks or types of networks (and communication links thereto) capable of carrying communications, media content, and/or data signals between delivery subsystem 102, chaptering subsystem 103, and access subsystem 104. For example, network 106 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying media content, data, and/or communications signals between delivery subsystem 102, chaptering subsystem 103, and access subsystem 104. Communications between delivery subsystem 102, chaptering subsystem 103, and access subsystem 104 may be transported using any one of the above-listed networks, or any combination or sub-combination of the above-listed networks.

Delivery subsystem 102 may be include or be implemented on any computing device or combination of computing devices, such as one or more servers (e.g., media transmission servers, video-on-demand ("VOD") servers, etc.), personal computers, or the like. Delivery subsystem 102 may be configured to transmit and/or receive communication signals, media content, and/or data to/from access subsystems 104. In some examples, delivery subsystem 102 may be configured to transmit (e.g., broadcast, multicast, and/or narrowcast) data representative of one or more media content programs to one or more access subsystems 104. Such data may be transmitted in one or more media content streams, as one or more data files, or in any other suitable manner as may serve a particular application. In certain embodiments, for example, delivery subsystem 102 may be configured to transmit (e.g., broadcast or multicast) one or more media content programs to one or more access subsystems 104 in accordance with a transmission schedule. Additionally or alternatively, in certain embodiments, delivery subsystem 102 may be configured to transmit one or more media content programs on-demand (e.g., VOD programs) in response to requests for the media content program(s) received from one or more access subsystems 104.

Access subsystems 104 may be configured to request and/or receive data representative of one or more media content programs from delivery subsystem 102 via network 106. Access subsystems 104 may process received media content programs, including presenting the media content programs for experiencing by users 108. In certain embodiments, access subsystems 104 may be configured to locally store media content programs received from delivery subsystem 102 for subsequent presentation and/or other processing. For example, access subsystems 104 may be configured to record received transmissions of media content programs to a local computer-readable medium.

In addition, access subsystems 104 may be configure to perform one or more media content chaptering operations. For example, access subsystems 104 may be configured to capture chaptering data for one or more media content programs based on user input provided by one or more users 108. Access subsystems 104 may be further configured to transmit data representative of captured chaptering data to chaptering subsystem 103, which may be configured to utilize the end-user-provided chaptering data in one or more media content chaptering operations. Exemplary media content chaptering operations are described in more detail further below.

Figure 2:
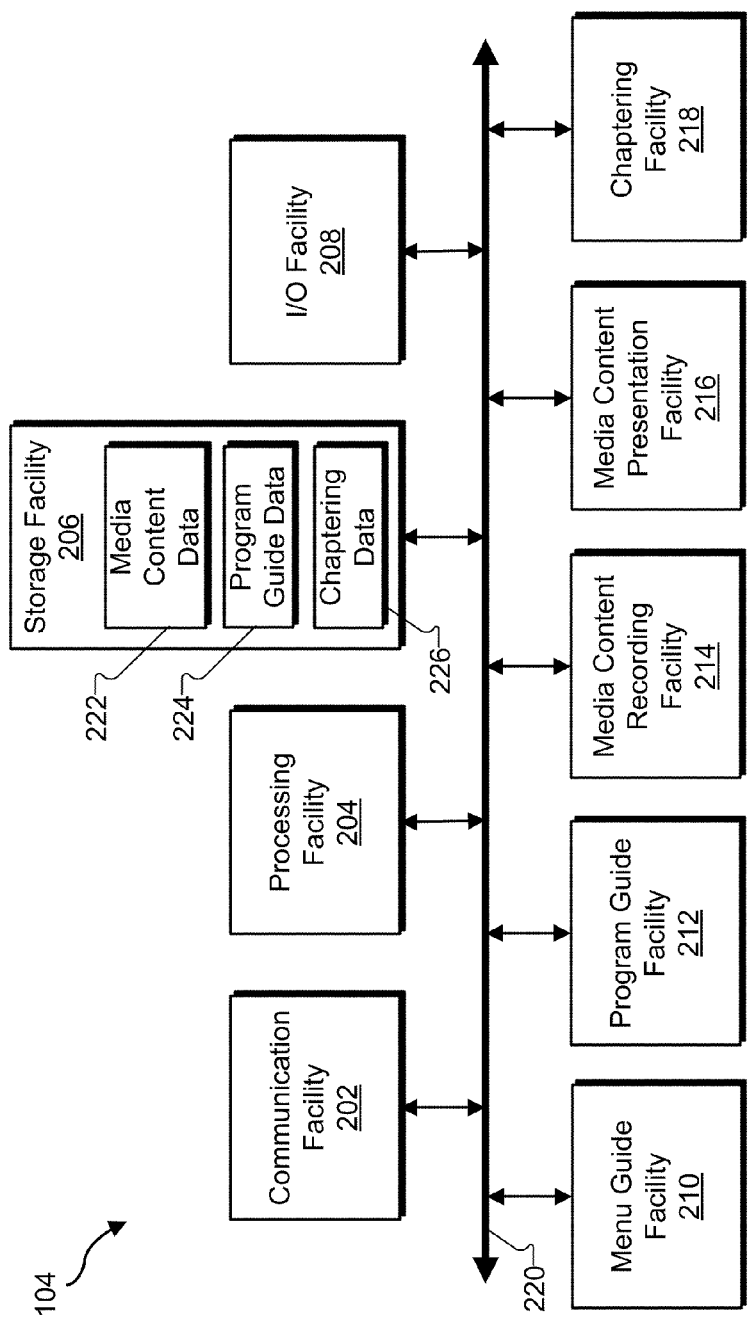
FIG. 2 illustrates exemplary components of a media content access subsystem.
Figure 3:
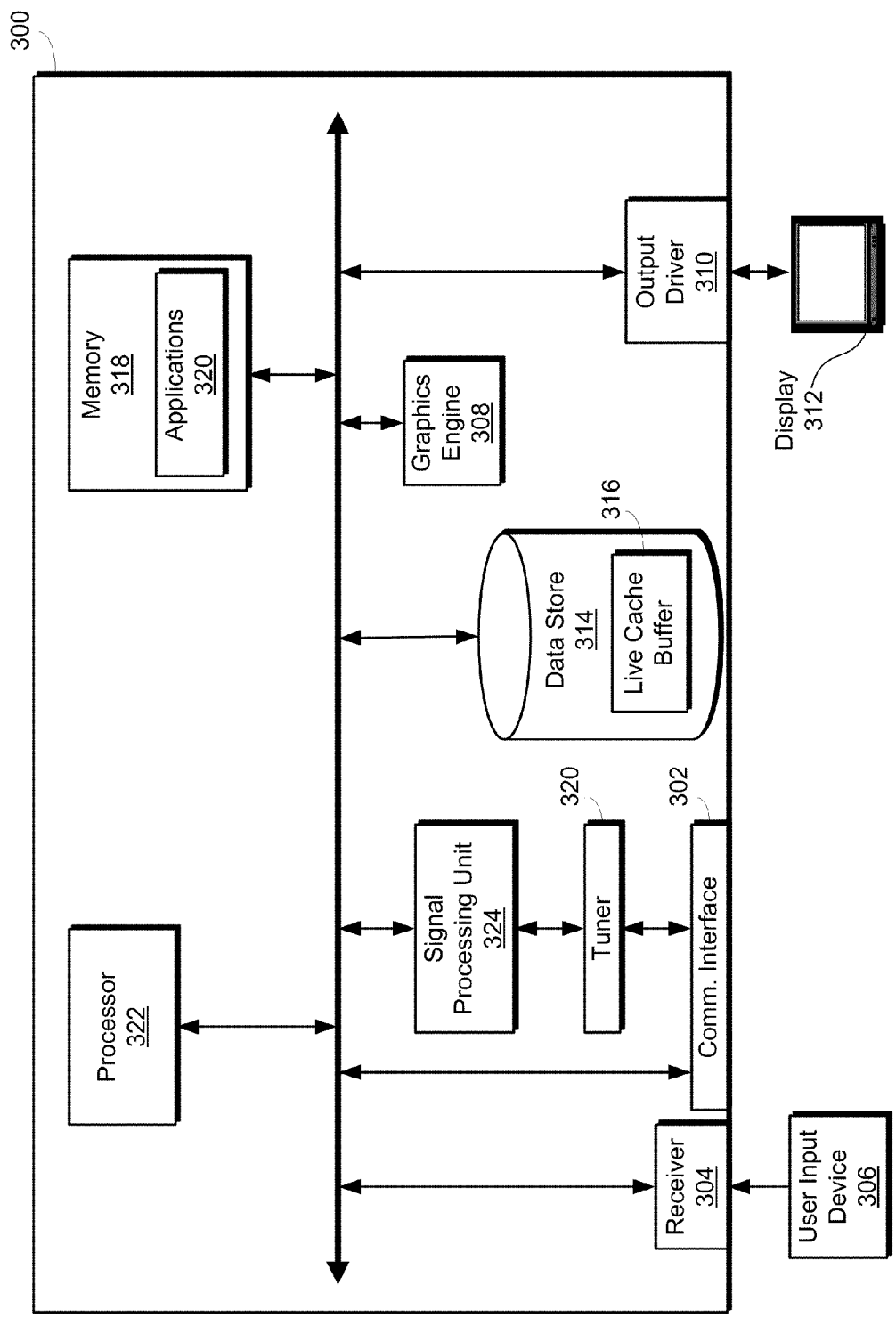
FIG. 3 illustrates an exemplary implementation of the media content access subsystem of FIG. 2.

To help facilitate an understanding of access subsystems 104, FIG. 2 illustrates exemplary components of an access subsystem 104. As shown in FIG. 3, access subsystem 104 may include a communication facility 202, processing facility 204, storage facility 206, input/output ("I/O") facility 208, menu guide facility 210, program guide facility 212, media content recording facility 214, media content presentation facility 216, and media content chaptering facility 218 communicatively coupled to one another via a communication infrastructure 220. The components of access subsystem 104 may communicate with one another, including sending data to and receiving data from one another via communication infrastructure 220, using any suitable communication technologies.

While an exemplary implementation of access subsystem 104 is shown in FIG. 2, the components illustrated in FIG. 2 are not intended to be limiting. Additional or alternative components may be used in other embodiments. Moreover, one or more components illustrated in FIG. 2 may be omitted from access subsystem 104 in other embodiments. Components of the access subsystem 104 shown in FIG. 2 will now be described in additional detail.

Communication facility 202 may be configured to facilitate communication between access subsystem 104 and delivery subsystem 102 and/or chaptering subsystem 103. In particular, communication facility 202 may be configured to transmit and/or receive communication signals, media content, and/or data (e.g., program guide content, media content chaptering data, etc.) to/from delivery subsystem 102 and/or chaptering subsystem 103. Examples of communication facility 202 may include, without limitation, a wired network interface (such as a network interface card), a wireless network interface (such as a wireless network interface card), a modem, and any other suitable interface. In at least one embodiment, communication facility 202 may provide a direct connection between access subsystem 104 and delivery subsystem 102 and/or chaptering subsystem 103 via a direct link to a network, such as the Internet. Communication facility 202 may additionally or alternatively provide such a connection through, for example, a local area network (such as an Ethernet network), a personal area network, a telephone or cable network, a cellular telephone connection, a satellite data connection, or any other suitable connection.

As mentioned, delivery subsystem 102 may transmit (e.g., broadcast, multicast, and/or narrowcast) media content streams representative of one or more media content programs. Communication facility 202 may be configured to receive such media content streams such that the media content streams may be processed by access subsystem 104. To this end, communication facility 202 may include any device, logic, and/or other technologies suitable for receiving signals, media content streams, and/or any other data as may serve a particular application. Communication facility 202 may be configured to interface with any suitable communication media, protocols, and formats, including any of those mentioned above.

In certain embodiments, delivery subsystem 102 may be configured to transmit and access subsystem 104 may be configured to receive media content streams carrying data representative of various media content programs in accordance with a transmission schedule. The transmission schedule may specify that particular media content programs are to be transmitted at scheduled transmission times and on certain media content carrier channels. As used herein, the term "scheduled transmission time" or "scheduled transmission" may refer generally to any period of time during which a media content program is to be transmitted to access subsystem 104. The term "media content carrier channel" or "content channel" as used herein may refer generally to any carrier of media content, including, but not limited to, media (e.g., television) channels, streams, addresses, frequencies or other carriers of media content.

Communication facility 202 may be configured to selectively identify, receive, and/or process appropriate media content streams at the scheduled transmission times and on the appropriate media content carrier channels. For instance, in certain implementations communication facility 202 may include a tuner configured to selectively receive media content carried on a particular media content carrier channel. The tuner may be tuned to a particular media content carrier channel such that the media content carried on the media content carrier channel is received and may be processed by access subsystem 104.

In some examples, communication facility 202 may include multiple tuners such that media content carried on different media content carrier channels may be concurrently received for processing by access subsystem 104. For example, communication facility 202 may include a first tuner configured to receive media content carried on an analog video signal and a second tuner configured to concurrently receive media content carried on a digital compressed signal.

While one or more tuners may be used to receive various types of media content-carrying signals (e.g., media content streams) transmitted by delivery subsystem 102, additionally or alternatively, communication facility 202 may be configured to receive other types of signals (e.g., other types of media content carrying signals) from delivery subsystem 102 and/or one or more other sources without using a tuner. For example, delivery subsystem 102 may transmit media content streams in the form of data packets (e.g., IP-based data packets) that can be received without using a tuner. For such types of signals, communication facility 202 may receive and forward the signals directly to other components of access subsystem 104 without the signals going through a tuner. For an IP-based signal, for example, communication facility 202 may function as an IP receiver.

In certain embodiments, access subsystem 104 may be configured to request and receive on-demand media content programs from delivery subsystem 102. For example, access subsystem 104 may transmit a request for a VOD program to delivery subsystem 102, which may receive the request and transmit a media content stream carrying the VOD program to access subsystem 104. Access subsystem 104 may receive the media content stream and process the VOD program (e.g., present the VOD program for experiencing by a user 108).

The above-described examples of access subsystem 104 receiving media content programs from delivery subsystem 102 are illustrative only. Delivery subsystem 102 may transmit and access subsystem 104 may receive data representative of one or more media content program in any suitable way and using any suitable technologies.

Communication facility 202 may be configured to transmit and receive media content chaptering data to/from chaptering subsystem 103. Communication facility 202 may also be configured to transmit requests for media content chaptering data to chaptering subsystem 103. Examples of access subsystem 104 transmitting chaptering data to chaptering subsystem 103, requesting and receiving chaptering data from chaptering subsystem 103, and processing chaptering data received from chaptering subsystem 103 are described further below.

Processing facility 204 may include one or more processors and may be configured to execute and/or direct execution of one or more of the access subsystem processes or operations described herein. Processing facility 204 may direct execution of operations in accordance with computer-executable instructions such as may be stored in storage facility 206 or another computer-readable medium. As an example, processing facility 204 may be configured to process data, including demodulating, decoding, and parsing acquired data (e.g., data representative of media content received from delivery subsystem), and encoding and modulating data for transmission by communication facility 202.

Storage facility 206 may include one or more data storage media, devices, and/or configurations and may employ any type, form, and combination of data storage media and/or device. For example, storage facility 206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage facility 206. For example, media content data 222 (e.g., data representative of recorded media content programs), program guide data 224, and media content chaptering data 226 may be stored in storage facility 206. In some examples, data may be arranged in one or more databases residing within storage facility 206.

I/O facility 208 may be configured to receive user input and provide user output and may include any hardware, firmware, middleware, software, or combination thereof supportive of input and output capabilities. For example, I/O facility 208 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O facility 208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O facility 208 is configured to provide graphical data to a display for presentation to a user 108.

Menu guide facility 210 may be configured to generate and provide graphical data representative of one or more interactive menu views to I/O facility 208 for display within one or more graphical user interfaces ("GUIs"). Exemplary menu views are described further below. In addition, menu guide facility 210 may be configured to initiate requests for data to be included in an interactive menu view in a GUI. For example, menu guide facility 210 may detect a user selection of a particular option in a menu guide facility 210 and, in response to the user selection, may initiate a request for data related to the selected option. As described in more detail further below, in some examples, such requested data may include media content chaptering data associated with a media content program.

Program guide facility 212 may be configured to maintain and operate on program guide data 224. As mentioned above, media content programs may be transmitted by delivery subsystem 102 at scheduled transmission times and on certain media content carrier channels. To assist access subsystem 104 and/or a user of access subsystem 104 with reception of media content programs at appropriate scheduled transmission times and on appropriate media content carrier channels, program guide data 224 may be received by communication facility 202 from delivery subsystem 102 and/or from another source. The program guide data 224 may be stored in storage facility 206.

Program guide facility 212 may be configured to arrange and provide graphical data representative of a program guide view to I/O facility 208 for inclusion in a GUI. I/O facility 208 may generate and provide a GUI including the program guide view to a display for presentation to a user. A program guide view may include a graphical arrangement of program guide data 224, one or more program guide tools (e.g., program guide navigation, search, and/or filter tools), one or more graphical selectors for navigating and highlighting selectable options, and/or other graphics. Typically, a program guide view presents at least a portion of a media content transmission schedule to a user 108. The user 108 may utilize the program guide view to access information about media content programs and scheduled transmission times and channels associated with the media content programs.

Media content recording facility 214 may be configured to record data representative of media content programs received from delivery subsystem 102 to storage facility 206. The recording of a media content program is typically performed during a transmission time slot when data representative of the media content program is received from delivery subsystem 102 as described above. For example, during transmission of a media content program from delivery subsystem 102 to access subsystem 104 on a media content carrier channel, communication facility 202 may receive data representative of the media content program on the media content carrier channel, and media content recording facility 214 may direct that the received data representative of the media content program be stored to storage facility 206. Once stored, the data representative the media content program may be accessed and processed as may suit a particular application, including providing data representative of the media content program to a display for presentation to a user 108.

Media content presentation facility 216 may be configured to control a presentation of media content to a user 108 of access subsystem 104. For example, media content presentation facility 216 may be configured to generate and provide graphical data representative of one or more media content presentation views to I/O facility 208 for display within one or more GUIs. Media content presentation facility 216 may control presentation (e.g., playback) of a media content program within such a media content presentation view. Exemplary media content presentation views are described further below.

Media content chaptering facility 218 (or simply "chaptering facility 218") may be configured to facilitate user-based chaptering of one or more media content programs. Examples of user-based chaptering processes and operations that may be performed by access subsystem 104 as directed by chaptering facility 218 are described further below.

In some examples, one or more of the facilities shown in FIG. 2 may be implemented at least in part as computing instructions (e.g., as one or more applications) residing within storage facility 206 and configured to direct processing facility 204 to perform and/or direct one or more other components of access subsystem 104 to perform one or more of the access subsystem processes and/or operations described herein. In certain embodiments, for example, chaptering facility 218 may be implemented, at least in part, as computing instructions residing within storage facility 206 and configured to direct processing facility 204 to perform one or more of the media content chaptering processes and/or functions described herein.

FIG. 3 illustrates an exemplary media content access device 300 having access subsystem 104 implemented thereon. Device 300 may include one or more of the components of access subsystem 104 shown in FIG. 3 and may be configured to perform one or more of the processes and/or operations described herein. Device 300 may include, but is not limited to, a set-top box, a media content processing device, a communications device, a mobile device (e.g., a mobile phone device), a handheld device, a personal computer, a phone device (e.g., a Verizon Hub device), a personal-digital assistant device, a gaming device, a digital video recording ("DVR") device (e.g., a personal video recording PVR device), a television device, and/or any device configured to perform one or more of the access subsystem processes and/or operations described herein.

As shown in FIG. 3, device 300 may include a communication interface 302, which may be configured to receive media content, chaptering data, and/or other data (e.g., metadata, program guide data, and/or any other data associated with media content and/or chaptering data) in any acceptable format from delivery subsystem 102, chaptering subsystem 103, and/or from any other suitable external source. Communication interface 302 may include any device, logic, and/or other technologies suitable for receiving signals, media content, and/or data. Communication interface 302 may be configured to interface with any suitable communication media, protocols, and formats, including any of those mentioned above.

Device 300 may also include a receiver 304 configured to receive user input signals from a user input device 306. User input device 306 may include, for example, a remote control device or any other suitable input device and may be configured to communicate with receiver 304 via a wireless link, electrical connection, or any other suitable communication link.

Device 300 may include a graphics engine 308 and an output driver 310. Graphics engine 308 may be configured to generate graphics to be provided to output driver 310, which may be configured to interface with or drive a display 312. Output driver 310 may provide output signals to display 312, the output signals including graphical data (e.g., graphical data representative of media content) generated by graphics engine 308 and to be presented by display 312 for experiencing by a user 108. Graphics engine 308 and output driver 310 may include any combination of hardware, software, and/or firmware as may serve a particular application.

Data store 314 may include one or more data storage media, devices, or configurations and may employ any type, form, and combination of storage media. For example, data store 314 may include, but is not limited to, a hard drive, network drive, flash drive, magnetic disc, optical disc, or other non-volatile storage unit. Electronic data, including data disclosed herein, may be temporarily and/or permanently stored in data store 314.

Data store 314 is shown to be included within device 300 in FIG. 3 for illustrative purposes only. It will be understood that data store 314 may additionally or alternatively be located external to device 300.

Data store 314 may include one or more live cache buffers 316. Live cache buffer 316 may additionally or alternatively reside in memory 318 or in a storage device external to device 300. In some examples, media content data may be temporarily stored in live cache buffer 316 to facilitate viewing and/or recording of the media content.

Device 300 may include memory 318. Memory 318 may include, but is not limited to, FLASH memory, random access memory ("RAM"), dynamic RAM ("DRAM"), other suitable computer-readable media, or any combination or sub-combination thereof. In some examples, one or more applications 320 configured to run on or otherwise be executed by device 300 may reside in memory 318.

Device 300 may include one or more tuners 320. Tuner 320 may be configured to selectively receive media content carried on a particular media content carrier channel such that the media content may be processed by device 300. In some examples, media content received by tuner 320 may be temporarily buffered, or stored, in the live cache buffer 316. If there are multiple tuners 320, there may be a live cache buffer 316 corresponding to each of the tuners 320.

While tuner 320 may be used to receive certain media content carrying signals transmitted by delivery subsystem 102, device 300 may be configured to receive other types of media content signals (including media content signals and/or program guide data signals) from delivery subsystem 102 and/or one or more other sources without using a tuner. For example, delivery subsystem 102 may transmit digital streams of data packets (e.g., IP-based data packets) that can be received without using a tuner. For such types of media content signals, communication interface 302 may receive and forward the signals directly to other components of device 300 (e.g., processor 322 or signal processing unit 324, described in more detail below) without the signals going through tuner 320. For an IP-based signal, for example, signal processing unit 324 may function as an IP receiver.

Device 300 may include at least one processor, such as processor 322, configured to control and/or perform one or more operations of device 300. Device 300 may also include a signal processing unit 324 configured to process incoming media content. Signal processing unit 324 may be configured, for example, to demodulate and parse encoded digital media content. In some examples, device 300 may include one or more signal processing units 324 corresponding to each of the tuners 320.

The device 300 shown in FIG. 3 is illustrative only. Access subsystem 104 may include or be implemented on one or more other suitable devices in other embodiments.

As mentioned, chaptering facility 218 of access subsystem 104 shown in FIG. 2 may be configured to perform and/or facilitate performance of user-based chaptering processes and/or operations. For example, chaptering facility 218 may direct access subsystem 104 to capture chaptering data for one or more media content programs based on user input and provide the captured chaptering data to chaptering subsystem 103 for use in additional chaptering processes and/or operations.

Figure 4:
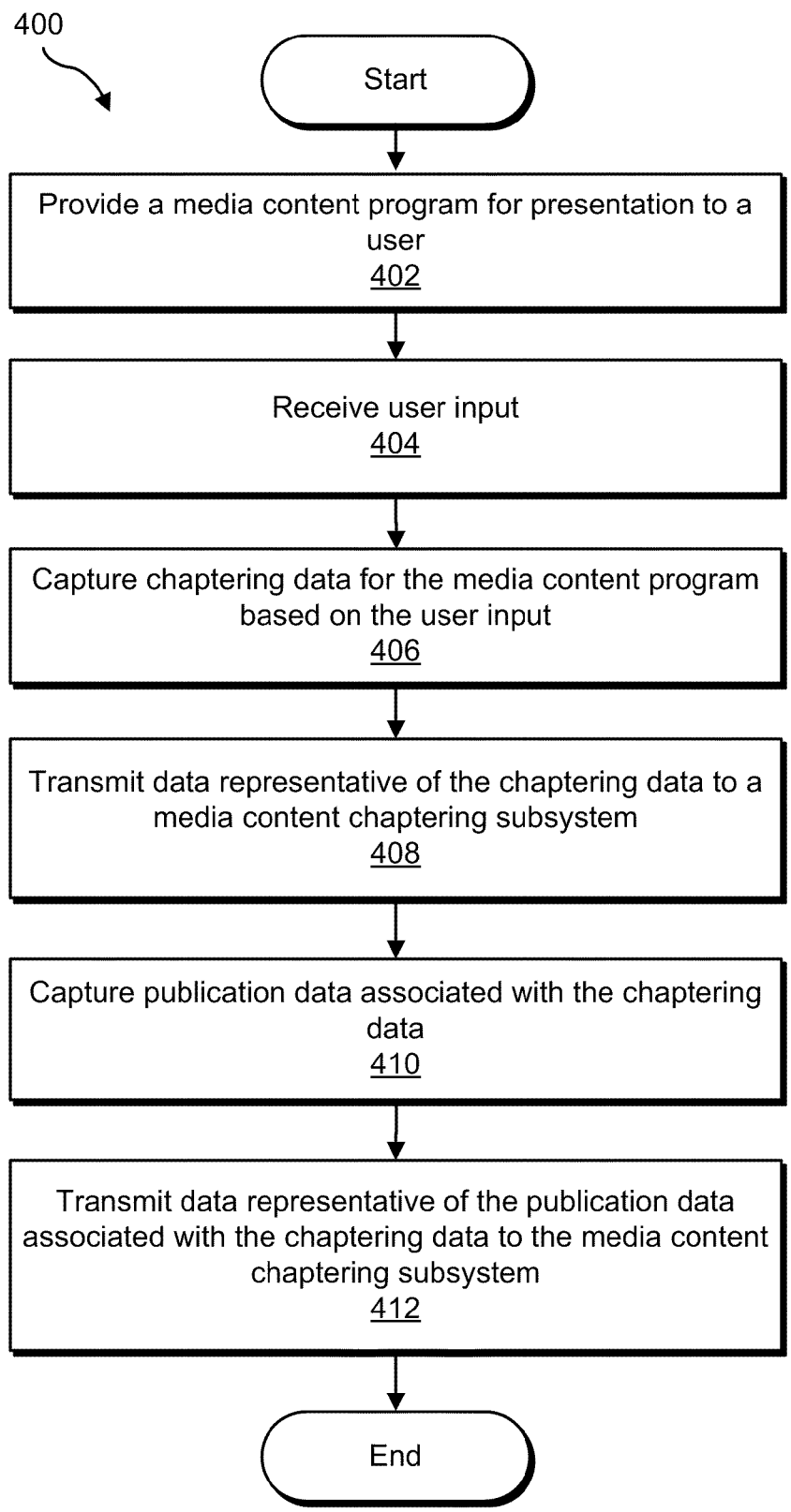
FIG. 4 illustrates an exemplary media content chaptering method.

To illustrate, FIG. 4 shows an exemplary media content chaptering method 400. While FIG. 4 illustrates exemplary steps according to one embodiment, other embodiments may omit, add to, reorder, and/or modify any of the steps shown in FIG. 4. In certain embodiments, one or more of the steps shown in FIG. 4 may be performed by access subsystem 104.

In step 402, a media content program is provided for presentation to a user 108. For example, access subsystem 104 may provide data representative of the media content program for presentation to the user 108. The media content program may be presented to the user 108 in any suitable way and may include displaying a video stream of the media content program for viewing by the user 108. The media content program presented in step 402 may be accessed from any suitable source by access subsystem 104, including from delivery subsystem 102 in any of the ways described above and/or from storage facility 206 (e.g., a previously recorded media content program stored in storage facility 206).

In step 404, user input is received. For example, access subsystem 104 may receive user input provided by a user 108 of access subsystem 104. The user input may be provided and received in any suitable way. For example, the user 108 may select an input button of input device 306. The input button may include a dedicated chaptering button or a soft button that is associated with a chaptering command during presentation of the media content program. As another example the, user 108 may select an option displayed in a GUI and associated with a chaptering command during presentation of the media content program.

In step 406, chaptering data for the media content program is captured based on the user input. For example, access subsystem 104 may capture chaptering data for the media content program presented in step 402 based on the user input received in step 404. Chaptering data that is captured based on user input may be referred to as "user-provided chaptering data" or "end-user-provided chaptering data."

Chaptering data captured in step 404 may include any data useful for identifying a segment within the media content program presented in step 402. In certain embodiments, for example, the chaptering data may include a snapshot image of the media content program and metadata associated with the snapshot image. In certain embodiments, the chaptering data may also include a caption for the snapshot image.

Figure 5:
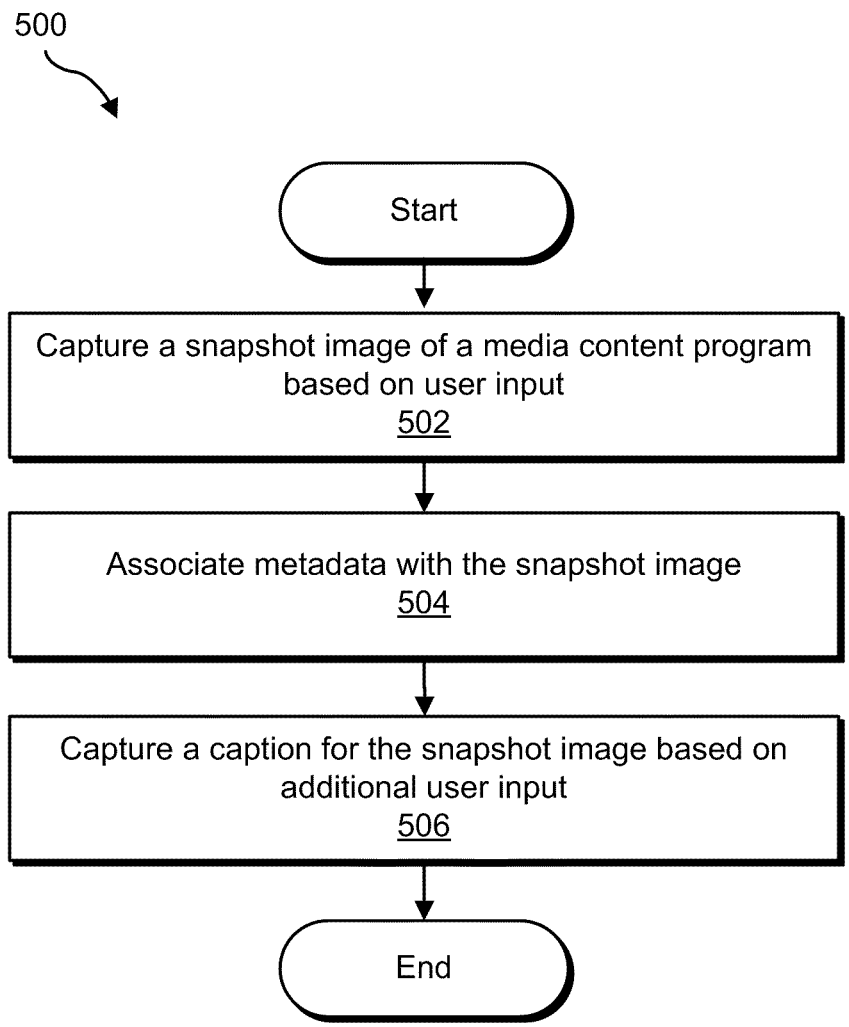
FIG. 5 illustrates another exemplary media content chaptering method.

To illustrate, FIG. 5 shows another exemplary media content chaptering method 500. Performance of step 406 of FIG. 4 may include performance of one or more of the steps of method 500. While FIG. 5 illustrates exemplary steps according to one embodiment, other embodiments may omit, add to, reorder, and/or modify any of the steps shown in FIG. 5. In certain embodiments, one or more of the steps shown in FIG. 5 may be performed by access subsystem 104.

In step 502, a snapshot image of a media content program is captured based on user input. For example, access subsystem 104 may capture a snapshot image of the media content program presented in step 402 of FIG. 4 based on the user input received in step 404 of FIG. 4. For instance, a user 108 of access subsystem 104 may provide user input at a particular time during presentation of the media content program. The user input may include any input indicating that a snapshot image of the media content program being presented should be captured. Access subsystem 104 may receive the user input (at step 404 of FIG. 4) and, in response to the user input, capture a snapshot image representative of a media content program image displayed at approximately the time the user input is received. Accordingly, the snapshot image may be associated with and represent a particular position within (e.g., a segment of) the media content program. In certain embodiments, for example, the snapshot image may comprise a frame within a video stream of the media content program. The snapshot image may be captured in any suitable format. For example, the snapshot image may be represented as an image file (e.g., as a JPEG or other image file).

In step 504, metadata is associated with the snapshot image. For example, access subsystem 104 may automatically identify and associate metadata with the snapshot image. The metadata may include any data descriptive of or otherwise related to the snapshot image. For example, the metadata may include, without limitation, a media content program identifier (or simply "program ID") indicative of the media content program from which the snapshot is captured, a media content carrier channel identifier (or simply "channel ID") indicative of the media content carrier channel associated with the presentation of the media content program, a user profile identifier (or simply "user profile ID") indicative of the user who provided the input received in step 404 of FIG. 4, a timestamp indicative of a time at which the snapshot image is captured in step 502, and any other data descriptive of the media content program (e.g., episode identifier, title, rating information, scheduled transmission time slot and channel, etc). In certain embodiments, a timestamp representative of when a snapshot image is captured may indicate a playback time within the media content program and associated with the snapshot image. Accordingly, the snapshot image may be associated with a playback time indicating a position within the media content program.

Access subsystem 104 may automatically identify the metadata associated with the snapshot using any suitable source of metadata. For example, metadata related to the media content program may be obtained from storage facility within access subsystem 104, delivery subsystem 102, and/or another other source.

In step 506, a caption for the snapshot image is captured based on additional user input. For example, access subsystem 104 may capture a caption for the snapshot image based on additional user input. The additional user input may be provided by a user 108 of access subsystem 104 in any suitable way. In certain embodiments, performance of step 506 may include access subsystem 104 receiving additional user input, the additional user input specifying a caption for the snapshot image, and associating the caption with the snapshot image. The caption may include any data descriptive of or otherwise associated with the snapshot image. For example, a user 108 of access subsystem 104 may create a brief description of the content of the snapshot image captured in step 502 and/or provide any other comment and/or information to be associated with the snapshot image.

Examples of GUI views associated with capture of user-based chaptering data such as a snapshot image, metadata associated with the snapshot image, and a caption associated with the snapshot image are described further below.

Returning to FIG. 4, in step 408, data representative of the chaptering data is transmitted to chaptering subsystem 103. For example, access subsystem 104 may transmit data representative of captured chaptering data (e.g., a snapshot image, metadata associated with the snapshot image, and a caption associated with the snapshot image) to chaptering subsystem 103 via network 106. Transmission of the chaptering data to chaptering subsystem 103 may be performed in any suitable way and using any suitable technology. The chaptering data may be transmitted to chaptering subsystem 103 for use in chaptering the media content program, as described further below.

In step 410, publication data associated with the chaptering data is captured. For example, access subsystem 104 may capture publication data associated with the chaptering data based on additional user input. In certain embodiments, performance of step 410 may include access subsystem 104 receiving additional user input specifying a publication setting for the snapshot image and associating the publication setting with the snapshot image. For instance, access subsystem 104 may provide one or more tools configured to facilitate a user 108 of access subsystem 104 providing user input descriptive of publication data to be associated with the chaptering data. The publication data may include any publication setting(s) and/or other data descriptive of how and/or to whom media content chaptering data is to be published by chaptering subsystem 103 for access by one or more access subsystems 104 via network 106. Examples of publication data and capture of publication data are described further below.

In step 412, data representative of the publication data associated with the chaptering data is transmitted to chaptering subsystem 103. For example, access subsystem 104 may transmit data representative of the publication data associated with the chaptering data to chaptering subsystem 103 via network 106. Transmission of the publication data to chaptering subsystem 103 may be performed in any suitable way and using any suitable technology. The publication data may be transmitted to chaptering subsystem 103 for use in publishing the chaptering data, as described further below.

Figure 6:
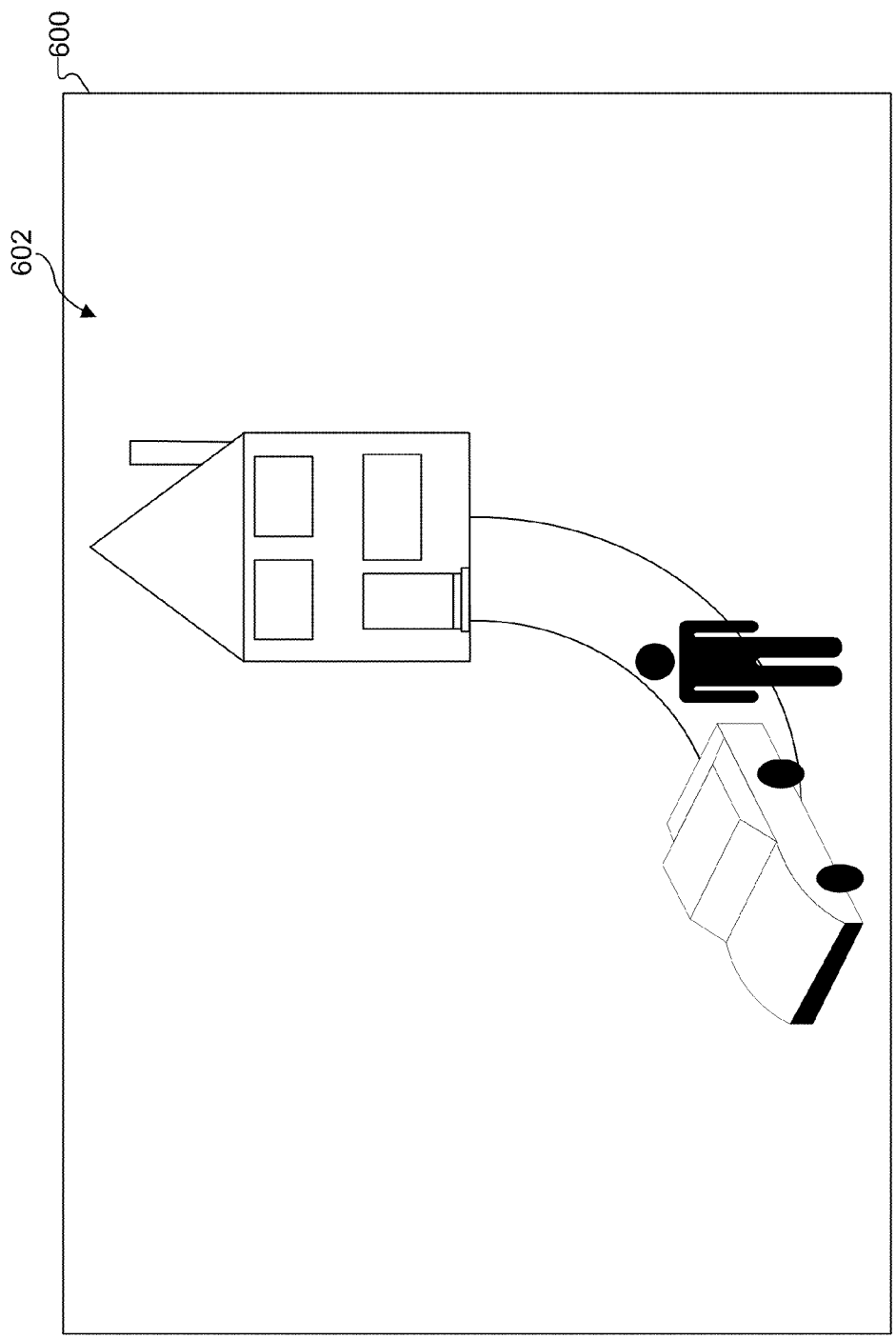
FIG. 6 illustrates a graphical user interface having an exemplary media content presentation view displayed therein.
Figure 7:
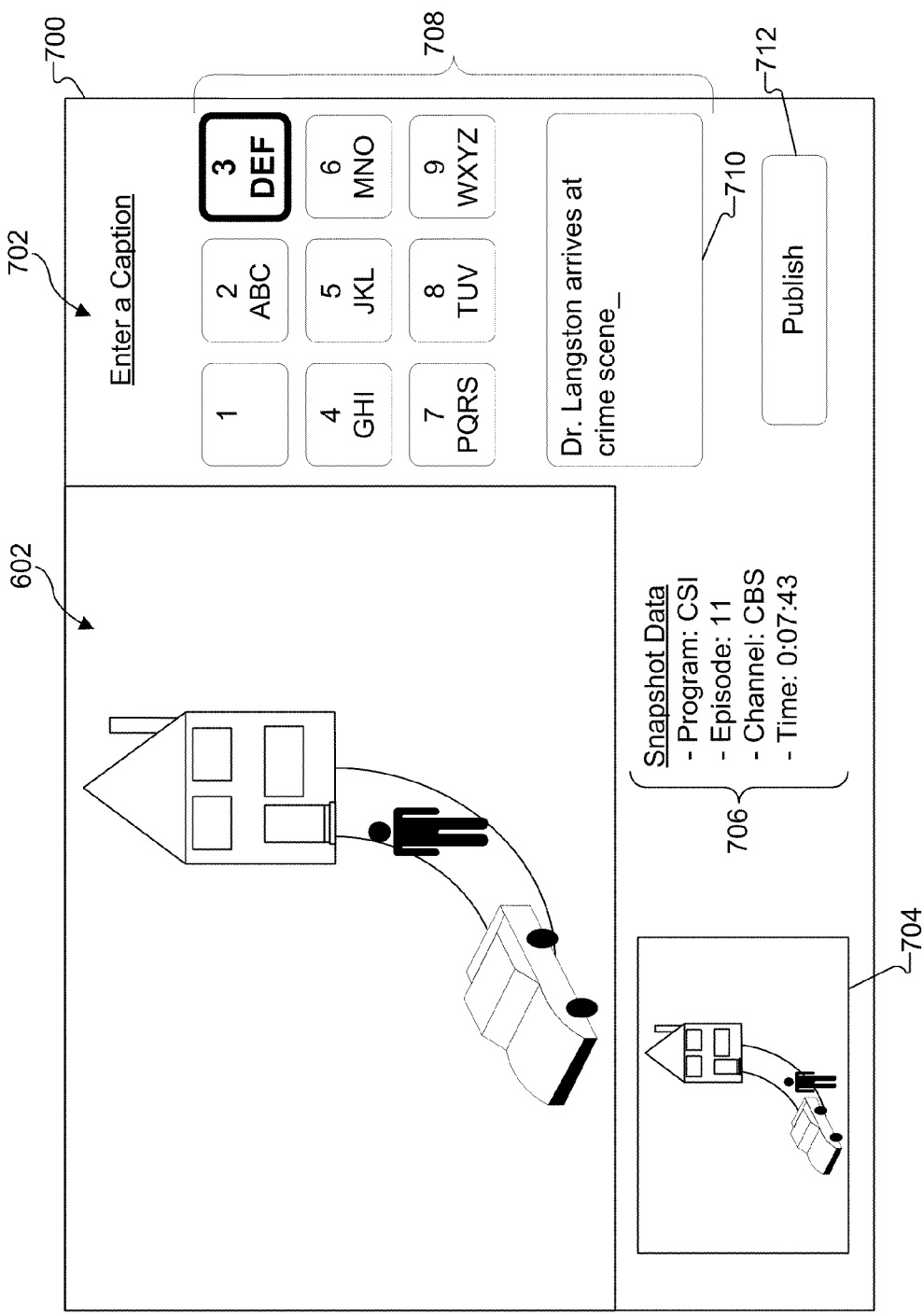
FIG. 7 illustrates an exemplary graphical user interface having a chaptering data capture view displayed therein.
Figure 8:
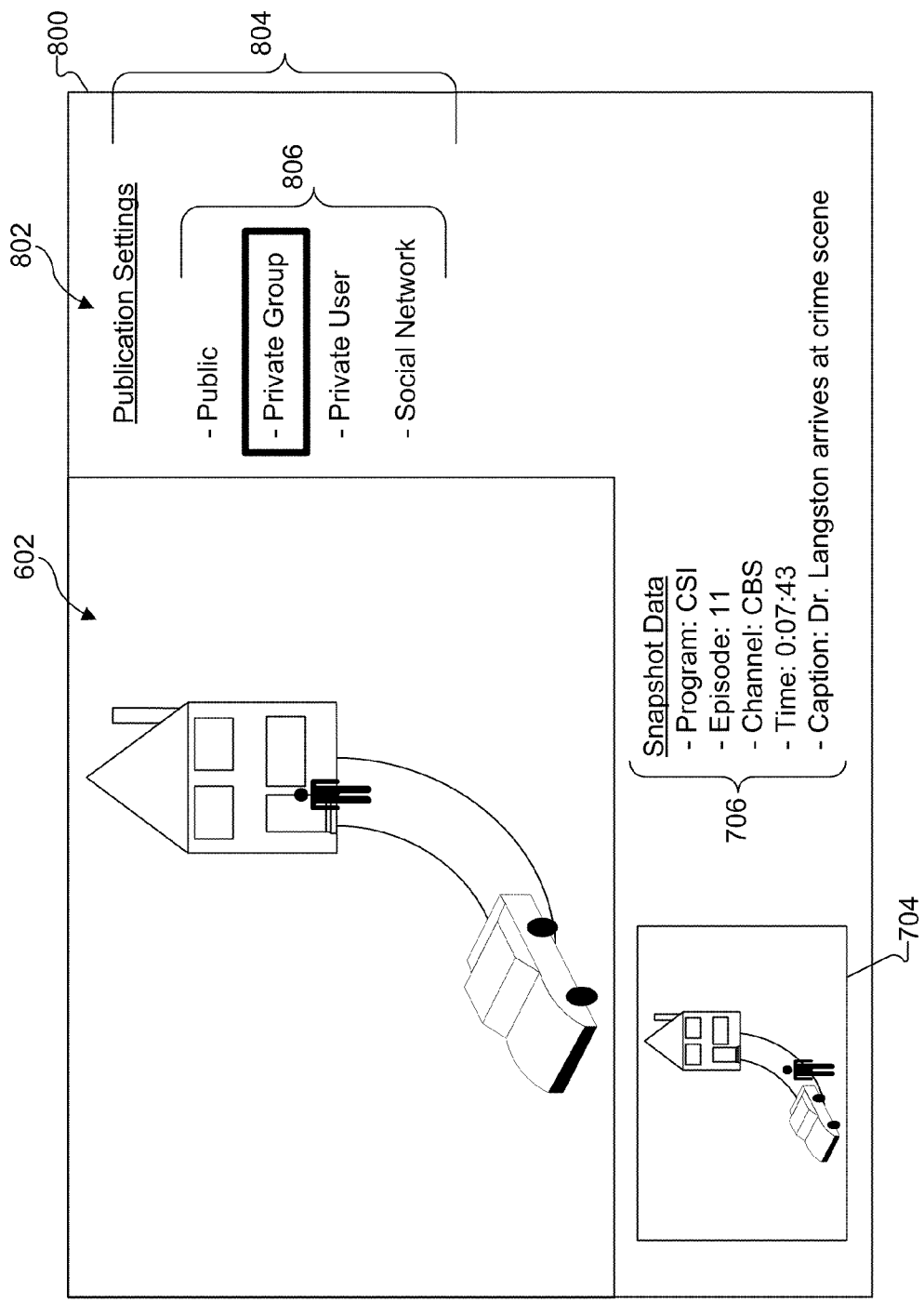
FIG. 8 illustrates a graphical user interface having an exemplary publication data capture view displayed therein.

To help facilitate an understanding of capturing user-based chaptering data and publication data, FIGS. 6-8 illustrate GUIs displaying exemplary views associated with capture of user-based chaptering data and publication data.

FIG. 6 illustrates a GUI 600 having an exemplary media content presentation view 602 displayed therein. As shown in FIG. 6, GUI 600 may provide a full-screen display of media content presentation view 602. A media content program may be presented (e.g., played back) within media content presentation view 602. In FIG. 6, an on-screen image of the media content program being presented in media content presentation view 602 is displayed. In some examples, the on-screen image displayed in FIG. 6 may coincide with a frame in a video stream of the media content program.

During presentation of the media content program in media content presentation view 602, user input may be received by access subsystem 104. The user input may indicate a desire of a user 108 of access subsystem 104 to capture a snapshot image of the media content program presented in media content presentation view 602. The user input may be provided by user 108 in any suitable way and/or format, including in any of the ways described above. In response to receipt of the user input, access subsystem 104 may capture a snapshot image representative of the on-screen image of the media content program displayed in media content presentation view 602 approximately when the user input is received.

In certain embodiments, in response to receipt of the user input, access subsystem 104 may provide a chaptering data capture view for display. For example, FIG. 7 illustrates a GUI 700 having an exemplary chaptering data capture view 702 displayed therein. As shown in FIG. 7, GUI 700 may include media content presentation view 602 displayed within a partial-screen display in GUI 700. Presentation (e.g., playback) of the media content program may continue in media content presentation view 602 in GUI 700.

Chaptering data capture view 702 may include information and/or one or more tools associated with capture of chaptering data. For example, chaptering data capture view 702 may include a snapshot image 704 graphically representing the captured snapshot image of the media content program. In addition, chaptering data capture view 702 may include graphical data representative of metadata 706 associated with snapshot image 704. The metadata 706 indicated in GUI 700 includes a program identifier (e.g., "CSI"), an episode identifier (e.g., "11"), a channel identifier (e.g., "CBS"), and a time identifier (e.g., "0:07:43") indicative of a playback time associated with the snapshot image 704.

Chaptering data capture view 702 may include a caption input tool 708, which may be configured to facilitate user input of a caption for snapshot image 704. In the illustrated example, caption input tool 708 includes a plurality of selectable buttons that may be selected by user 108 to spell out a caption. As user 108 utilizes caption input tool 708 to provide a caption, data representative of the caption may be displayed in an input field 710 of caption input tool 708, as shown in FIG. 7.

While an exemplary chaptering data capture view 702 is shown in FIG. 7, the example is illustrative only. Chaptering data capture view 702 may be modified as may suit a particular implementation. As an example, caption input tool 708 is shown in FIG. 7. Additionally or alternatively, one or more other tools may be provided to facilitate input of other information to be associated with snapshot image 704. Accordingly, user 108 may be able to provide and associate any information with snapshot image 704. Examples of such information may include, without limitation, actor/actress names (e.g., "Tom Cruise"), names of geographic locations (e.g., "Sydney, Australia"), graphical images (e.g., a picture of an actor/actress), and any information related to snapshot image 704.

Information associated with snapshot image 704 may be stored in or as part of metadata 706 associated with snapshot image 704. Accordingly, as described in more detail further below, the information included in the metadata 706 may be used to filter and access select snapshot images. As an example, user 108 may "tag" snapshot image 704 with information about a geographic location depicted in snapshot image (e.g., "Las Vegas, Nev."). The geographic location tag may be stored within metadata 706 for snapshot image 704 and may be used to filter and access snapshot image 704 as described further below.

After user 108 has provided a caption for snapshot image 704, user 108 may select a publish command button 712 to indicate that the snapshot image 704 and corresponding metadata 706 are ready for publication. In response to a user selection of publish command button 712, access subsystem 104 may provide a publication setting capture view for display.

For example, FIG. 8 illustrates a GUI 800 having an exemplary publication setting capture view 802 displayed therein. As shown in FIG. 8, GUI 800 may include media content presentation view 602 displayed within a partial-screen display in GUI 800. Presentation (e.g., playback) of the media content program may continue in media content presentation view 602 in GUI 800. In addition, graphical data representative of snapshot image 704 and metadata 706 associated with snapshot image 704 may be displayed in GUI 800. As shown in FIG. 8, metadata 706 may now include graphical data representative of the caption input by user 108 and captured by access subsystem 104.

Publication setting capture view 802 may include information and/or one or more tools configured to facilitate user selection of one or more publication settings to be associated with captured chaptering data (e.g., snapshot image 704 and metadata 706). In the example illustrated in FIG. 8, publication setting capture view 802 includes a publication setting selection tool 804 configured to facilitate a user 108 providing additional user input specifying at least one publication setting for the snapshot image. Publication setting selection tool 804 may include a plurality of selectable publication options 806. As shown in FIG. 8, publication options 804 may include a "public" option, a "private group" option, a "private user" option, and a "social network" option. The "public" option may be associated with a publication setting configured to direct chaptering subsystem 103 to make chaptering data available to all users 108 and/or access subsystems 104 associated with the users 108 having access to chaptering subsystem 103. The "private group" option may be associated with a publication setting configured to direct chaptering subsystem 103 to make chaptering data available to a select group of users 108 and/or access subsystems 104 associated with the group of users 108. The "private user" option may be associated with a publication setting configured to direct chaptering subsystem 103 to make chaptering data available to a select user 108 and/or one or more access subsystems 104 associated with the user 108. The "social network" option may be associated with a publication setting configured to direct chaptering subsystem 103 to make chaptering data available to a predefined and/or select social networking platform (e.g., a social network website such as Facebook) and/or to a group of users defined within a social networking platform. While a single "social network" option is shown in FIG. 8, this is illustrative only. Publication options 806 may include various options, including a separate option for each social network with which user 108 is associated.

User 108 may select one or more of the publication options 806 in publication setting capture view 802. Accordingly, user 108 may control distribution of chaptering data.

In response to a user selection of the "private group" option, access subsystem 104 may provide one or more tools configured to facilitate a user selection of a group of users 108. Such tools may enable the user 108 providing chaptering data to select from predefined user groups (e.g., groups labeled "family," "friends," or "work") and/or to create a custom group of users 108 to which chaptering data will be made available by chaptering subsystem 103. In response to a user selection of the "private user" option, access subsystem 104 may provide one or more tools configured to facilitate a user selection of a particular user 108 to whom chaptering data will be made available by chaptering subsystem 103.

In certain embodiments, access subsystem 104 may access a user profile associated with the user 108 providing chaptering data to identify and provide data representative of predefined user groups and/or particular users associated with the user profile. Data representative of the user profile may be stored in storage facility 206 and/or remotely such as at delivery subsystem 102 and/or chaptering subsystem 103.

In response to a user selection of one or more publication settings for association with snapshot image 704 and metadata 706, access subsystem 104 may transmit data representative of snapshot image 704, metadata 706, and selected publication settings to chaptering subsystem 103. In the above-described or similar manner, a user 108 providing chaptering data to chaptering subsystem 103 may indicate to whom the chaptering data will be made available by chaptering subsystem 103.

Chaptering subsystem 103 may be configured to utilize user-based chaptering data and publication settings data received from one or more access subsystems 104 for one or more media content chaptering processes and/or operations. For example, chaptering subsystem 103 may be configured to maintain and selectively publish chaptering data for access by one or more access subsystems 104 via network 106. Access subsystems 104 and/or users 108 of access subsystems 104 may utilize chaptering data received from chaptering subsystem 103 for segment-based processing of one or more media content programs.

Figure 9:
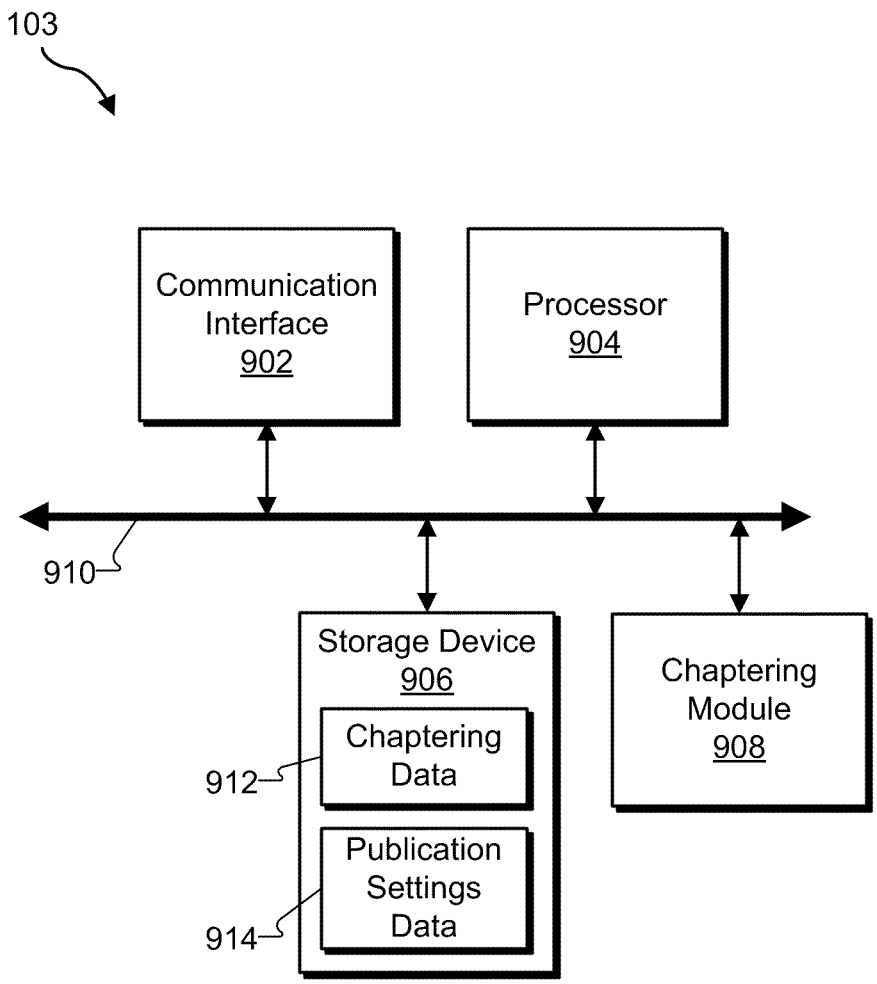
FIG. 9 illustrates exemplary components of a media content chaptering subsystem.

FIG. 9 illustrates exemplary components of chaptering subsystem 103. As shown in FIG. 9, chaptering subsystem 103 may include a communication interface 902, a processor 904, a storage device 906, and a chaptering module 908 communicatively coupled one to another via a communication infrastructure 910. The components of chaptering subsystem 103 may communicate with one another, including sending data to and receiving data from one another, using any suitable communication technologies. Moreover, the components of chaptering subsystem 103 may be implemented on any computing device or combination of computing devices, such as one or more servers, personal computers, or the like.

While an exemplary implementation of chaptering subsystem 103 is shown in FIG. 9, the components illustrated in FIG. 9 are not intended to be limiting. Additional or alternative components may be used in other embodiments. Components of the chaptering subsystem 103 shown in FIG. 9 will now be described in additional detail.

Communication interface 902 may be configured to communicate with one or more computing devices, including access subsystems 104 and/or delivery subsystem 102. In particular, communication interface 902 may be configured to transmit and/or receive communication signals, media content, and/or data to/from access subsystem 104 and/or delivery subsystem 102. Examples of communication interface 902 may include, without limitation, a wired network interface (such as a network interface card), a wireless network interface (such as a wireless network interface card), a modem, a transmitter, a transceiver, and any other suitable interface. In at least one embodiment, communication interface 902 may provide a direct connection between chaptering subsystem 103 and access subsystems 104 and/or delivery subsystem 102 via a direct link to a network, such as the Internet. Communication interface 902 may additionally or alternatively provide such a connection through, for example, a local area network (such as an Ethernet network), a personal area network, a telephone or cable network, a cellular telephone connection, a satellite data connection, or any other suitable connection.

Processor 904 generally represents any type or form of processing unit capable of processing data or interpreting, executing, and/or directing execution of one or more of the chaptering subsystem instructions, processes, and/or operations described herein. Processor 904 may direct execution of operations in accordance with computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, end-user-based media content chaptering data 912 and/or publication settings data 914 received from one or more access subsystems 104 may be stored within storage device 906. Chaptering data 912 may include any chaptering data described above, including, for example, one or more user-provided snapshot images and metadata for the snapshot images. Publication settings data 914 may include any of the publication settings described above. In some examples, chaptering data 912 and/or publication settings data 914 may be arranged in one or more databases and/or data libraries residing within storage device 906.

Chaptering module 908 may comprise any hardware, computing instructions (e.g., software stored in storage device 906 or another computer-readable medium), or combination of hardware and computing instructions configured to perform or initiate performance of one or more of the chaptering subsystem media content chaptering processes and/or operations described herein. For example, chaptering module 908 may be configured to direct chaptering subsystem 103 to maintain chaptering data 912 and publication settings data 914 in storage device 906. In certain embodiments, the maintaining of chaptering data 912 may include receiving and aggregating end-user-provided chaptering data 912 from various access subsystems 104 and/or users 108 of access subsystems 104. The chaptering data 912 may be aggregated within a library of end-user-provided chaptering stored in storage device 906. Accordingly, the end-user-provided chaptering data 912 maintained in storage device 906 may be referred to as community-based media content chaptering data that has been received from one or more communities of access subsystems 104 and/or users 108.

Chaptering module 908 may be further configured to selectively publish chaptering data 912 for access by one or more access subsystems 104 via network 106 based on publication settings data 914. Accordingly, end-user-provided chaptering data 912 may be shared within communities of access subsystems 104 and/or users 108 of access subsystems 104 in accordance with publication settings provided by the end users 108 from whom chaptering data 912 is received.

Figure 10:
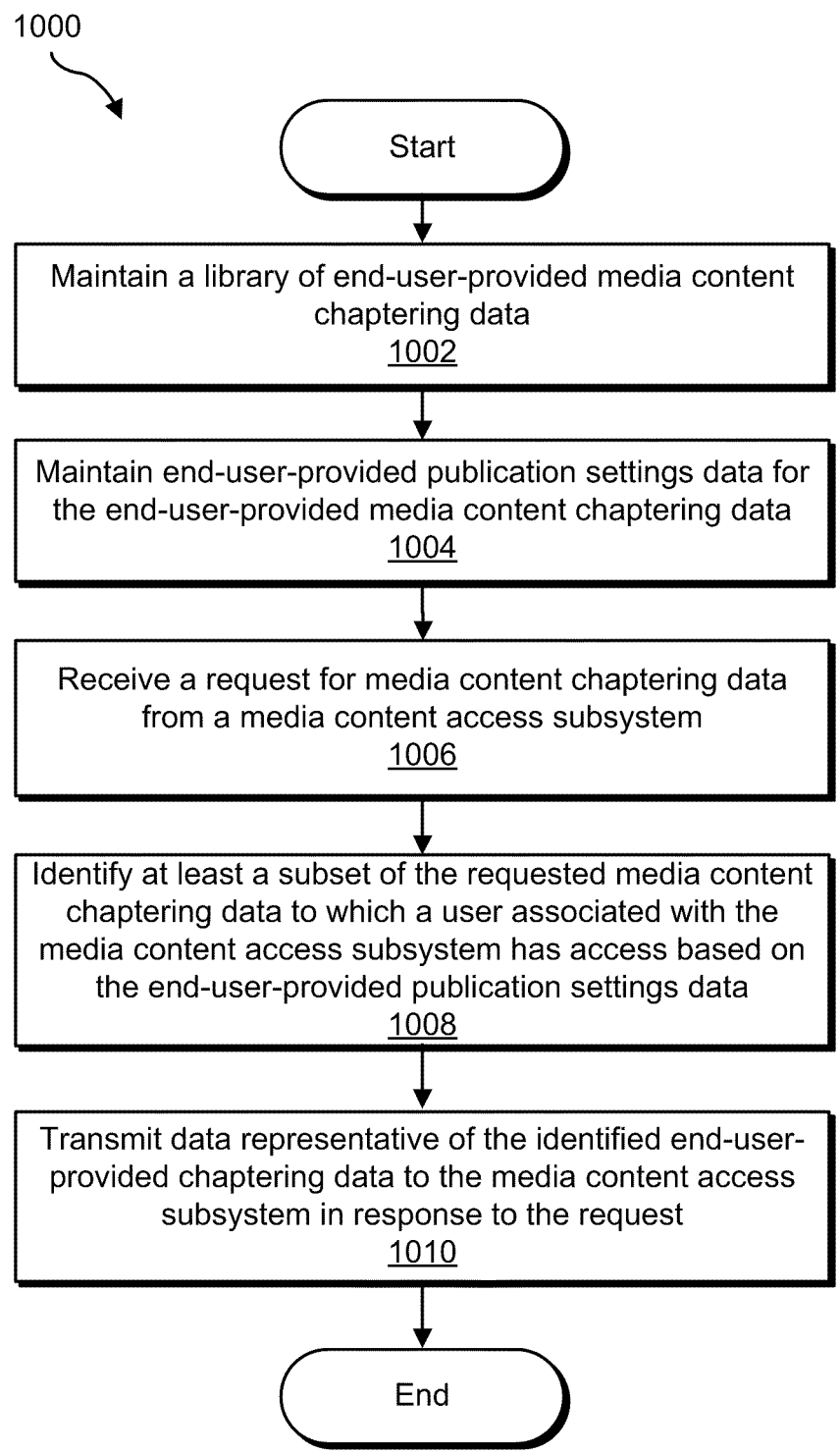
FIG. 10 illustrates another exemplary media content chaptering method.

To illustrate, FIG. 10 shows another exemplary media content chaptering method 1000. While FIG. 10 illustrates exemplary steps according to one embodiment, other embodiments may omit, add to, reorder, and/or modify any of the steps shown in FIG. 10. In certain embodiments, one or more of the steps shown in FIG. 10 may be performed by chaptering subsystem 103.

In step 1002, a library of end-user-provided media content chaptering data 912 is maintained. For example, capturing subsystem 103 may maintain a library of end-user-provided media content chaptering data 912 in storage device 906 as described above. In certain embodiments, chaptering data 912 may be received from multiple access subsystems 104 and/or users 108 associated with multiple access subsystems 104. Chaptering subsystem 103 may aggregate the received chaptering data 912 in a library of chaptering data 912 in storage device 906.

In step 1004, end-user-provided publication settings data 914 for the end-user-provided media content chaptering data 912 is maintained. For example, chaptering subsystem 103 may maintain publication settings data 914 for the chaptering data 912 in storage device 906 as described above. As mentioned, publication settings data 914 may include one or more publication settings associated with chaptering data 912. Accordingly, chaptering subsystem 103 may selectively publish chaptering data 912 based on publication settings data 914 associated with the chaptering data 912. In certain embodiments, chaptering subsystem 103 may be configured to maintain publication settings data 914 within one or more user profiles. For example, publication settings received from a particular user 108 may be maintained within a user profile associated with the user 108. Accordingly, chaptering subsystem 103 may access the user profile to determine publication settings for chaptering data 912 provided by the user 108.

In step 1006, a request for media content chaptering data is received from an access subsystem 104. For example, chaptering subsystem 103 may receive a request for media content chaptering data from an access subsystem 104 via network 106. The access subsystem 104 from which the request is received may be the same access subsystem 104 that previously provided the requested chaptering data to chaptering subsystem 103 or a different access subsystem 104 than the access subsystem 104 that previously provided the requested chaptering data to chaptering subsystem 103.

In step 1008, at least a subset of the requested media content chaptering data to which a user 108 associated with the requesting media content access subsystem 104 has access is identified based on end-user-provided publication settings data 914. For example, chaptering subsystem 103 may identify, based on end-user-provided publication settings data 914, at least a subset of the requested media content chaptering data stored in storage device 906 to which a user 108 associated with the requesting media content access subsystem 104 has access. Publication settings data 914 may be utilized in any suitable way by chaptering subsystem 103 to identify chaptering data to which the requesting access subsystem 104 and/or a user 108 of the requesting access subsystem has permission to access. For example, chaptering subsystem 103 may identify one or more publication settings associated with the requested chaptering data. Such a relationship may be represented within chaptering data 912 and/or publication settings data 914 in any suitable way. Chaptering subsystem 103 may then utilize the identified publication setting(s) to determine whether the requesting access subsystem 104 and/or a user 108 of the requesting access subsystem has permission to access the requested chaptering data.

As an example, in certain embodiments, when a request for chaptering data is received by chaptering subsystem 103, chaptering subsystem 103 may identify a user 108 who provided the requested chaptering data (e.g., from a user profile ID in the chaptering data) and access the user profile associated with the user 108 to determine publication settings for the chaptering data 912. Publication settings within the user profile may indicate one or more users 108 and/or groups of users 108 (e.g., a "friends" grouping of users). If data representative of a user 108 associated with the access subsystem 104 requesting the chaptering data is found in the user profile, chaptering subsystem 103 may determine that the access subsystem 104 and/or the user 108 associated with the access subsystem 104 has permission to access the requested chaptering data.

In step 1010, data representative of the identified end-user-provided chaptering data is transmitted to the requesting access subsystem 104 in response to the request. For example, chaptering subsystem 103 may transmit data representative of the chaptering data identified in step 1008 to the access subsystem 104 in response to the request received from access subsystem 104.

An access subsystem 104 may utilize chaptering data 912 received from chaptering subsystem 103 in one or more access subsystem processes, operations, services, and/or applications, including one or more chaptering processes or operations. For example, access subsystem 104 may provide chaptering data 912 for display within one or more GUI views such as a menu guide view and/or a program guide view. As another example, access subsystem 104 may be configured to initiate presentation (e.g., playback) of a media content program from a position within the media content program based on chaptering data 912 (e.g., from a position associated with a snapshot image of the media content program).

Figure 11:
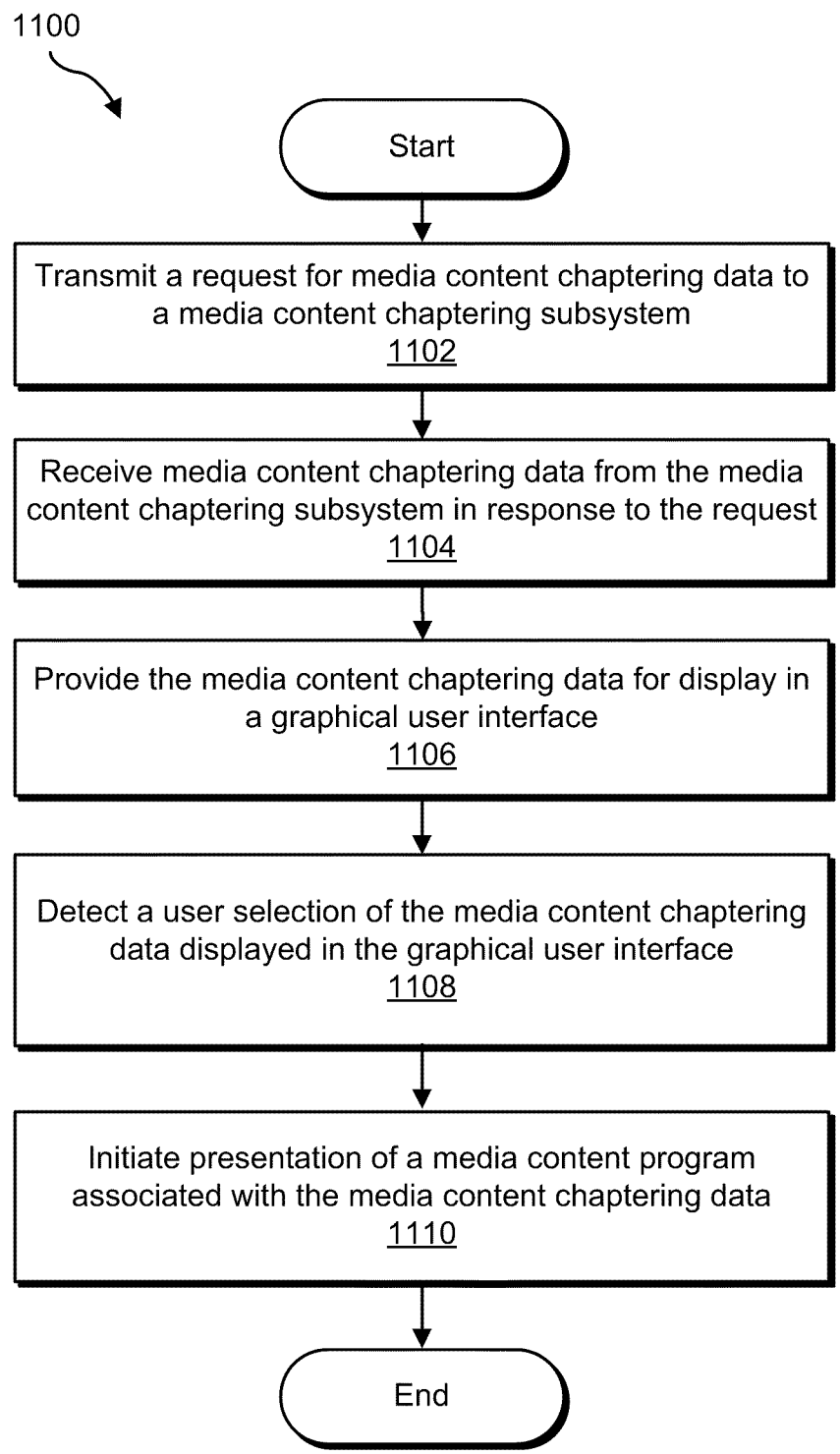
FIG. 11 illustrates an exemplary method for accessing and utilizing media content chaptering data.

FIG. 11 illustrates an exemplary method 1100 for accessing and utilizing media content chaptering data. While FIG. 11 illustrates exemplary steps according to one embodiment, other embodiments may omit, add to, reorder, and/or modify any of the steps shown in FIG. 11. In certain embodiments, one or more of the steps shown in FIG. 11 may be performed by an access subsystem 104.

In step 1102, a request for media content chaptering data is transmitted to a media content chaptering subsystem. For example, an access subsystem 104 may transmit a request for media content chaptering data to chaptering subsystem 103 via network 106.

In step 1104, media content chaptering data is received from chaptering subsystem 103 via network 106 in response to the request. For example, the requesting access subsystem 104 may receive the media content chaptering data (e.g., data representative of a snapshot image and associated metadata) from chaptering subsystem 103 via network 106 in response to the request.

In step 1106, the media content chaptering data is provided for display in a GUI. For example, access subsystem 104 may provide data representative of the media content chaptering data for display in a GUI.

In step 1108, a user selection of the media content chaptering data displayed in the GUI is detected. For example, access subsystem 104 may detect a user selection of graphical data representative of the media content chaptering data displayed in the GUI. The user selection may comprise any suitable form of user input and may be detected in any suitable way by access subsystem 104.

In step 1110, presentation of a media content program associated with the media content chaptering data is initiated. For example, access subsystem 104 may initiate presentation of a media content program associated with the media content chaptering data in response to the user selection detected in step 1108. In certain embodiments, presentation of the media content program may be initiated from a position within the media content program that coincides with the media content chaptering data. For example, the media content chaptering data may comprise a snapshot image associated with a playback time within the media content program. Access subsystem 104 may initiate presentation of the media content program beginning at the playback time associated with the snapshot image.

To further illustrate an access subsystem 104 accessing and utilizing end-user-provided chaptering data 914 maintained by chaptering subsystem 103, FIGS. 12-17 show GUIs displaying exemplary views associated with access and utilization of user-based chaptering data. An access subsystem 104 may generate and provide the GUIs for display and viewing by a user 108 of the access subsystem 104.

Figure 12:
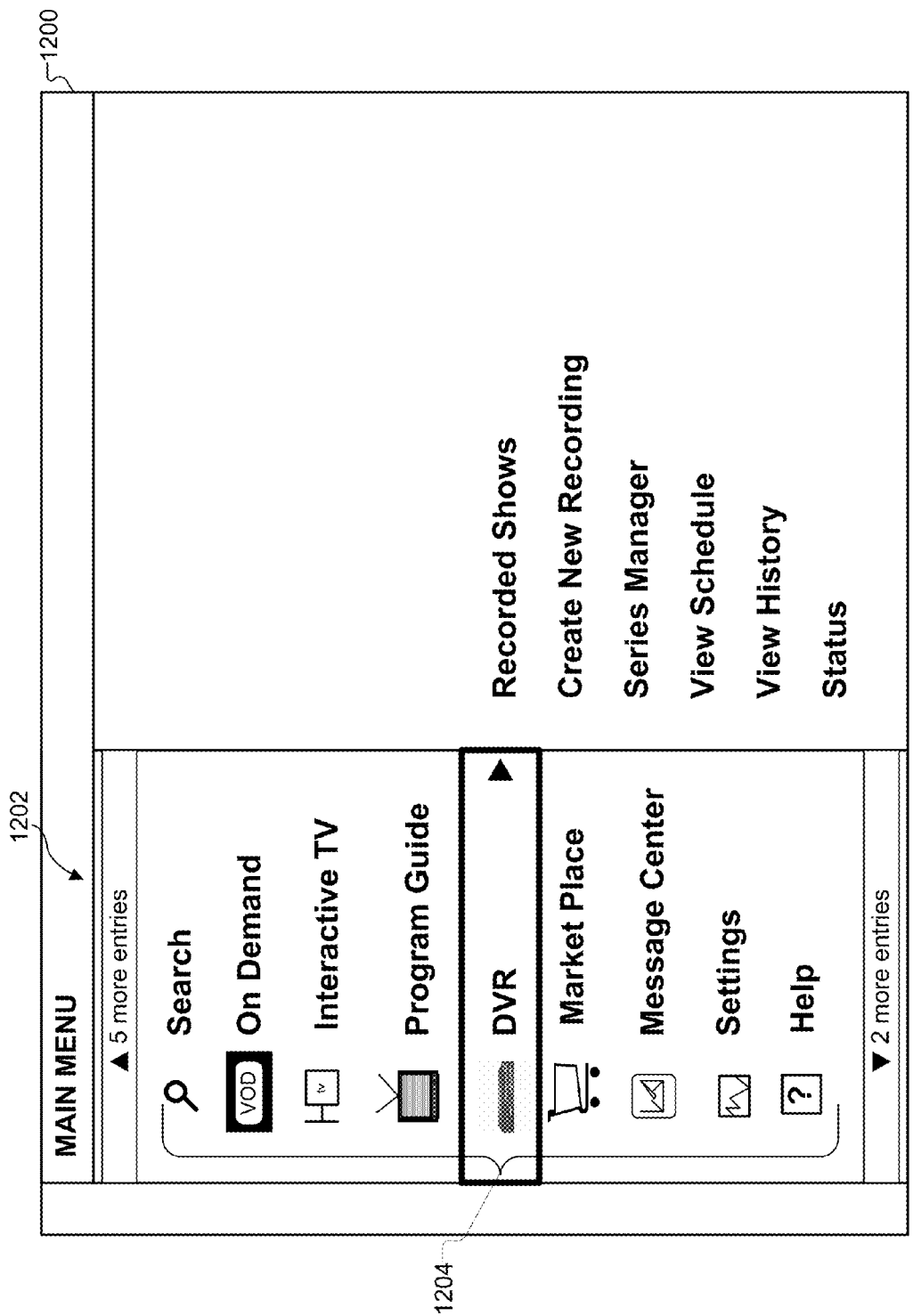
FIG. 12 illustrates a graphical user interface having an exemplary main menu view displayed therein.

FIG. 12 illustrates a GUI 1200 having a main menu view 1202 displayed therein. As shown in FIG. 12, main menu view 1202 may include a plurality of menu options 1204. In response to a user selection of a "DVR" (digital video recording) menu option within the plurality of menu options 1204, access subsystem 104 may provide a DVR main menu view for display.

Figure 13:
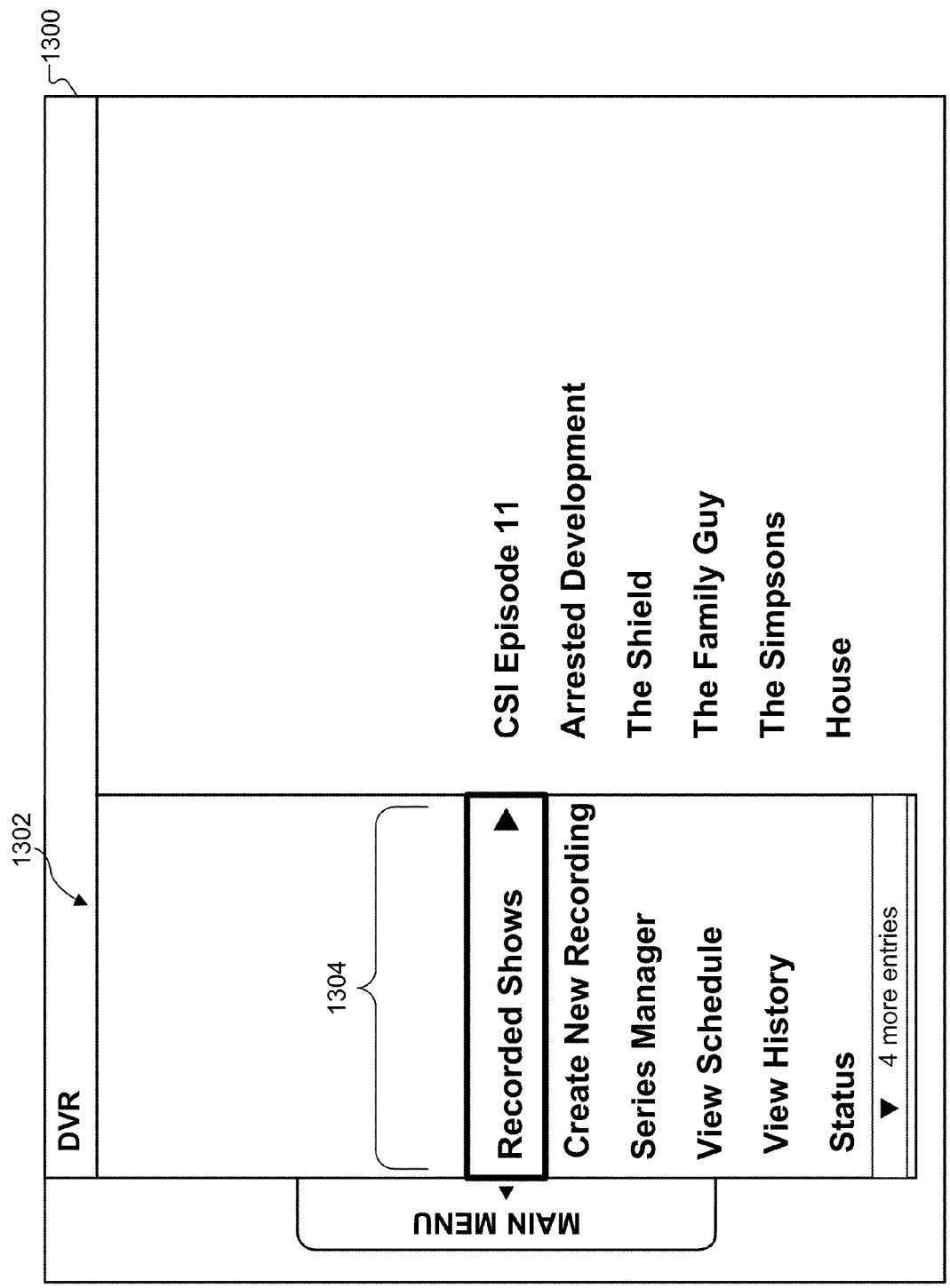
FIG. 13 illustrates a graphical user interface having an exemplary digital video recording ("DVR") menu displayed therein.

For example, FIG. 13 illustrates a GUI 1300 having an exemplary DVR menu view 1302 displayed therein. As shown in FIG. 13, DVR menu view 1302 may include a plurality of DVR menu options 1304 displayed therein. In response to a user selection of a "recorded shows" option within the DVR menu options 1304, access subsystem 104 may provide a recorded shows menu view for display.

Figure 14:
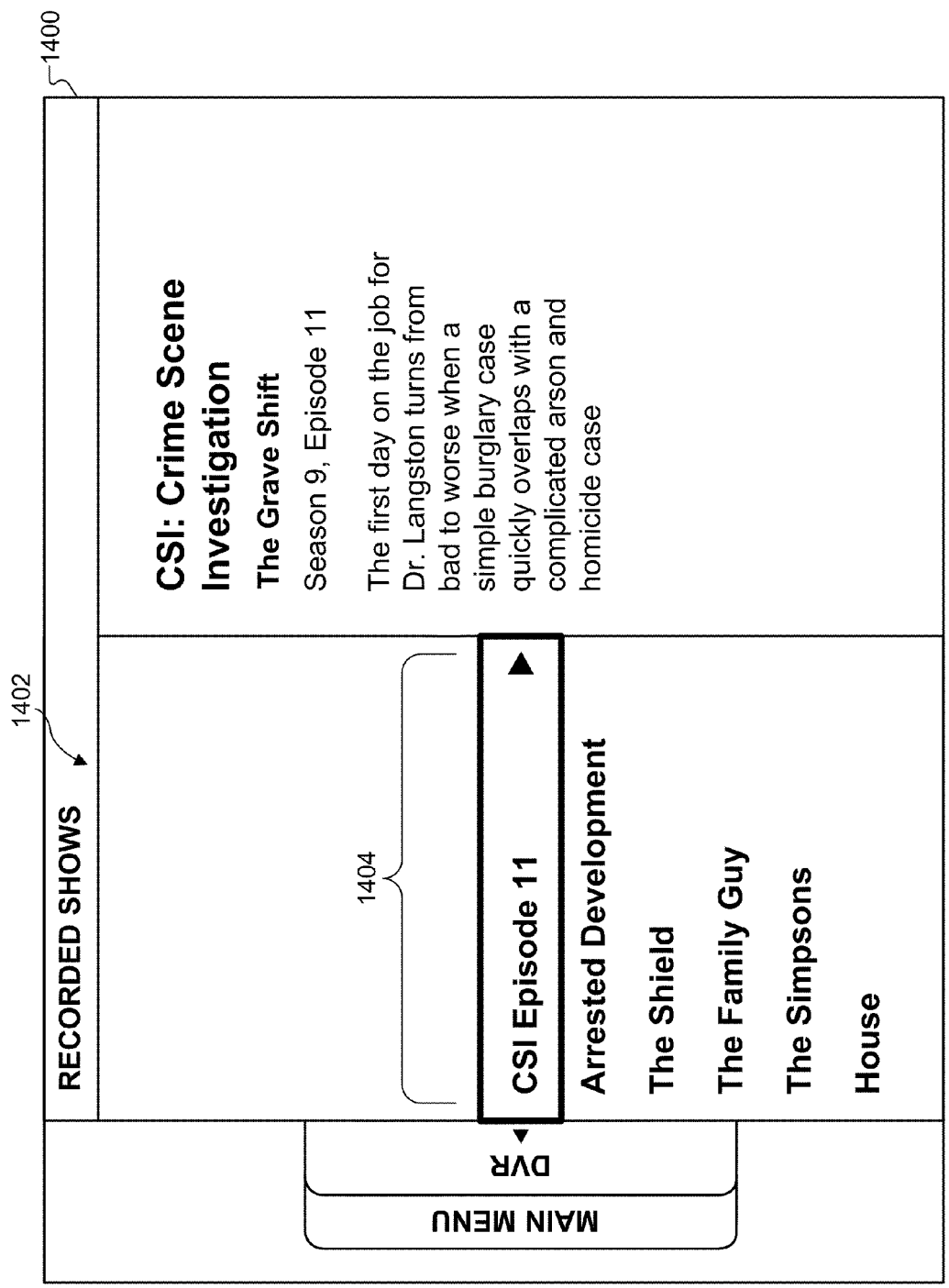
FIG. 14 illustrates a graphical user interface having an exemplary recorded shows menu view displayed therein.

For example, FIG. 14 illustrates a GUI 1400 having an exemplary recorded shows menu view 1402 displayed therein. As shown in FIG. 14, recorded shows menu view 1402 may include graphical data representative of a plurality of recorded shows 1404 displayed therein. The recorded shows represented in recorded shows menu view 1402 may comprise media content programs that have been recorded to storage facility 206 by media content recording facility 214 of access subsystem 104. In the example illustrated in FIG. 14, one of the recorded shows is labeled "CSI Episode 11," which corresponds to a particular recorded media content program.

Figure 15:
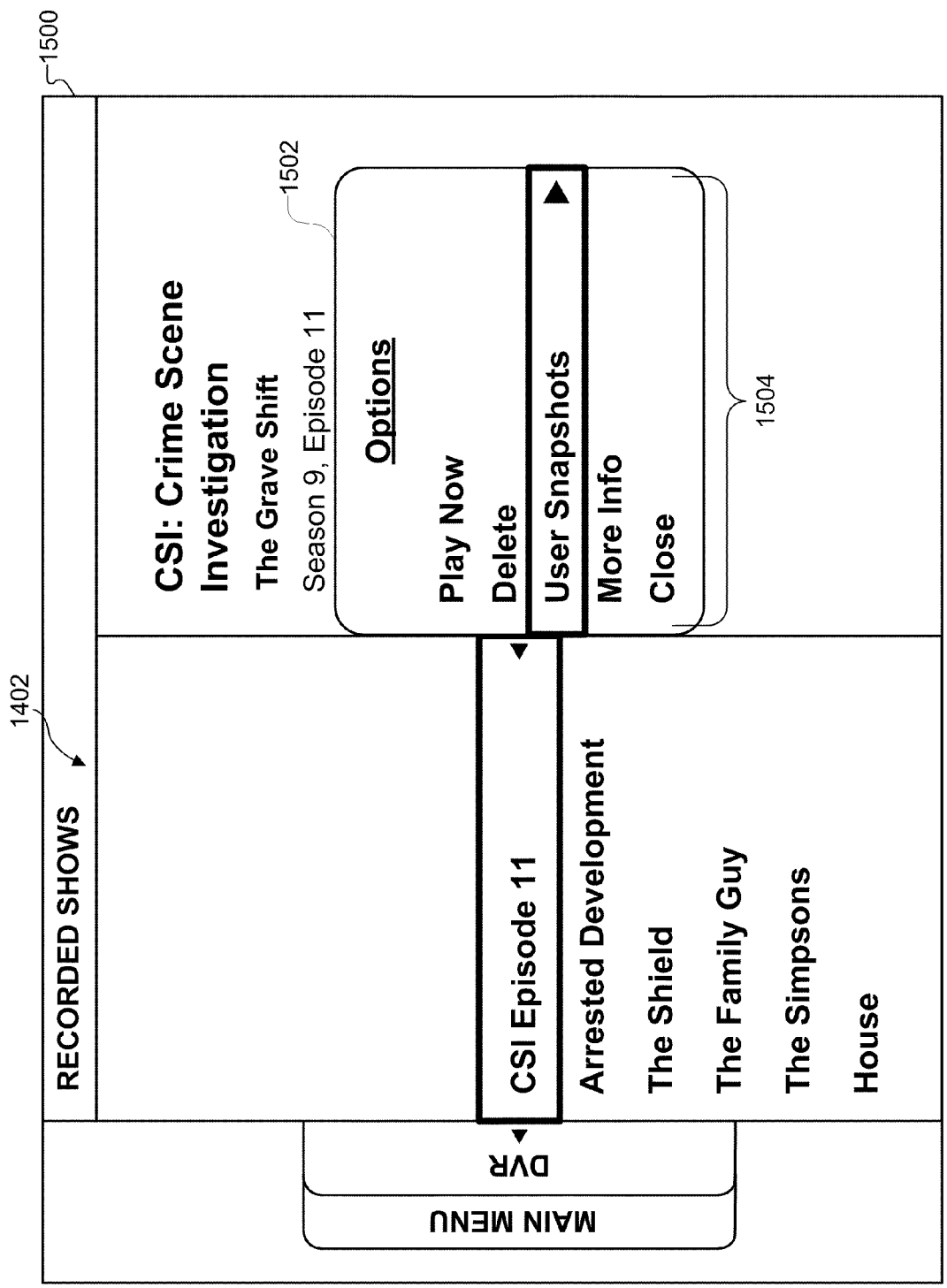
FIG. 15 illustrates a graphical user interface having exemplary selectable options associated with a selected media content program displayed therein.

In response to a user selection of a graphical data associated with a recorded media content program in recorded shows menu view 1402, access subsystem 104 may provide a program options view for display. For example, FIG. 15 illustrates a GUI 1500 having an exemplary program options view 1502 displayed therein. As shown in FIG. 15, program options view 1502 may include a plurality of options 1504 associated with the selected media content program (the media content program known as "CSI Episode 11"). In the illustrated example, the plurality of options 1504 includes a "play now" option, a "delete" option, a "user snapshots" option, a "more info" option, and a "close" option. In response to a user selection of the "user snapshots" option shown in FIG. 15, access subsystem 104 may provide a user snapshots view for display.

Figure 16:
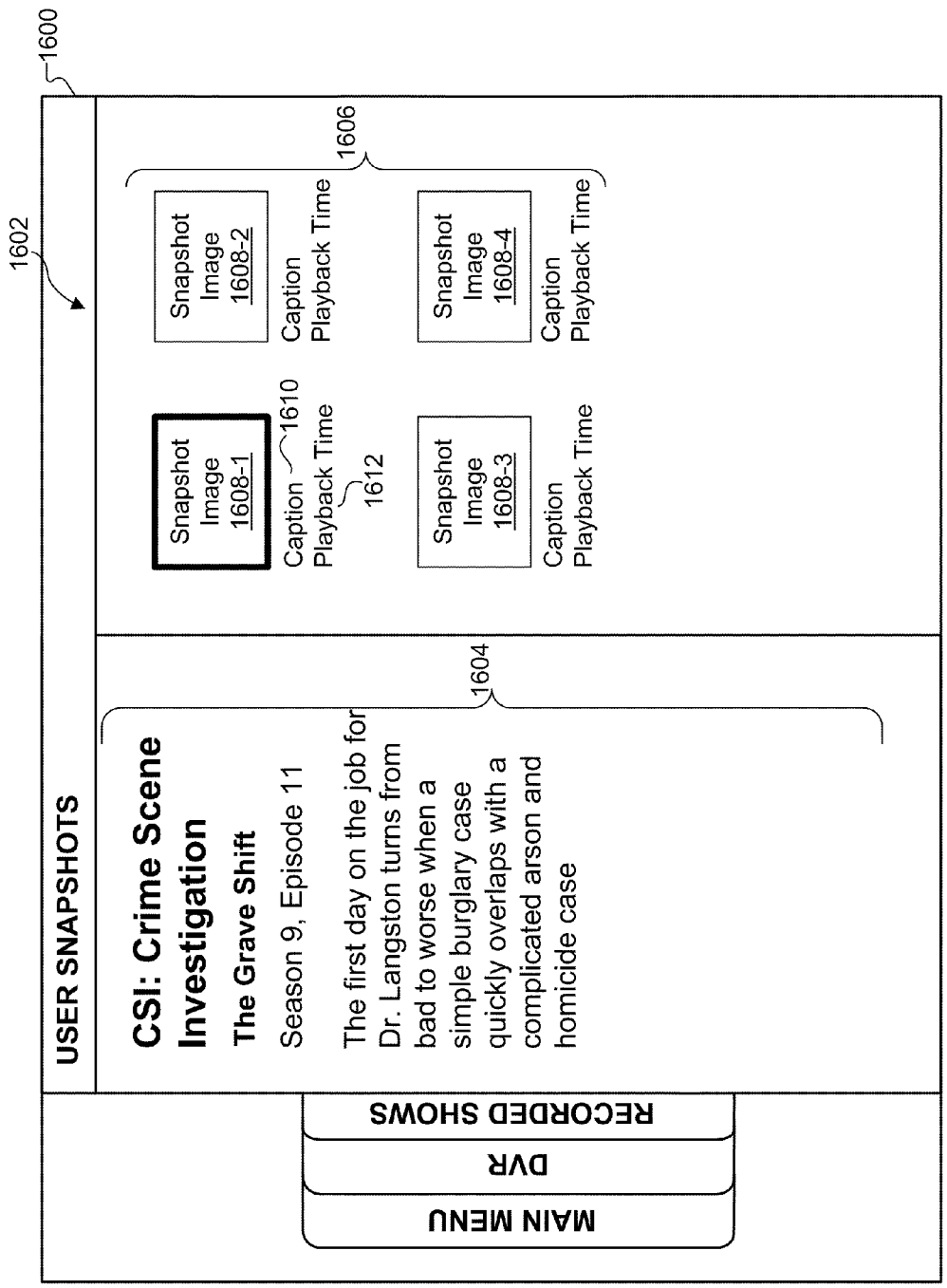
FIG. 16 illustrates a graphical user interface having an exemplary user snapshots view displayed therein.

For example, FIG. 16 illustrates a GUI 1600 having an exemplary user snapshots view 1602 displayed therein. As shown in FIG. 16, user snapshots view 1602 may include information 1604 about a selected media content program (e.g., a media content program known as "CSI Episode 11"). In addition, user snapshots view 1602 may include graphical data representative of chaptering data 1606 associated with the selected media content program. In the example illustrated in FIG. 16, chaptering data 1606 includes a plurality of snapshot images 1608 (e.g., snapshot images 1608-1 through 1608-4). Snapshot images 1608 shown in FIG. 16 may correspond to end-user-provided snapshot images, such as snapshot image 704 illustrated in FIG. 7, received, maintained, and published by chaptering subsystem 103.

User snapshots view 1602 may also include graphical data representative of metadata associated with snapshot images 1608. For example, user snapshots view 1602 may include graphical data representative of captions for snapshot images 1608. User snapshots view 1602 may also include graphical data representative of playback times associated with snapshot images 1608. As an example, a caption 1610 and a playback time 1612 corresponding to snapshot image 1608-1 are displayed in GUI 1600 along with snapshot image 1608-1. If snapshot image 1608-1 is the same as snapshot image 704 shown in FIG. 7, caption 1610 and playback time 1612 may indicate "Dr. Langston arrives at crime scene" and "0:07:43," respectively.

As part of generating user snapshots view 1602 for display, access subsystem 104 may request and receive data representative of chaptering data 1606 associated with the selected media content instance from chaptering subsystem 103. The chaptering data 1606 associated with the selected media content program may be requested and received by access subsystem 104 as described above in connection with FIG. 11.

The exemplary user snapshots view 1602 shown in FIG. 16 is illustrative only. User snapshots view 1602 may be modified as may suit a particular implementation. For example, in certain embodiments, user snapshots view 1602 may include one or more tools configured to facilitate user-controlled filtering of chaptering data. With a snapshot image filter tool, for instance, a user may select one or more criteria that may be used to filter snapshot images. Examples of such filter criteria may include, without limitation, a user (e.g., a friend) or group of users who provided snapshot images (e.g., all snapshot images provided by a user names "Bill"), an actor/actress name, a geographic location, a date or range of dates, and any other criteria that may be used to filter snapshot images. System 100 may be configured to compare filter criteria against metadata associated with snapshot images to identify and present one or more of the snapshot images that satisfy the filter criteria. Accordingly, a user may search for and access specific snapshot images for display in user snapshots view 1602. To illustrate, a user may request and access only snapshot images that have been provided to system 100 by a friend named "Bill."

Figure 17:
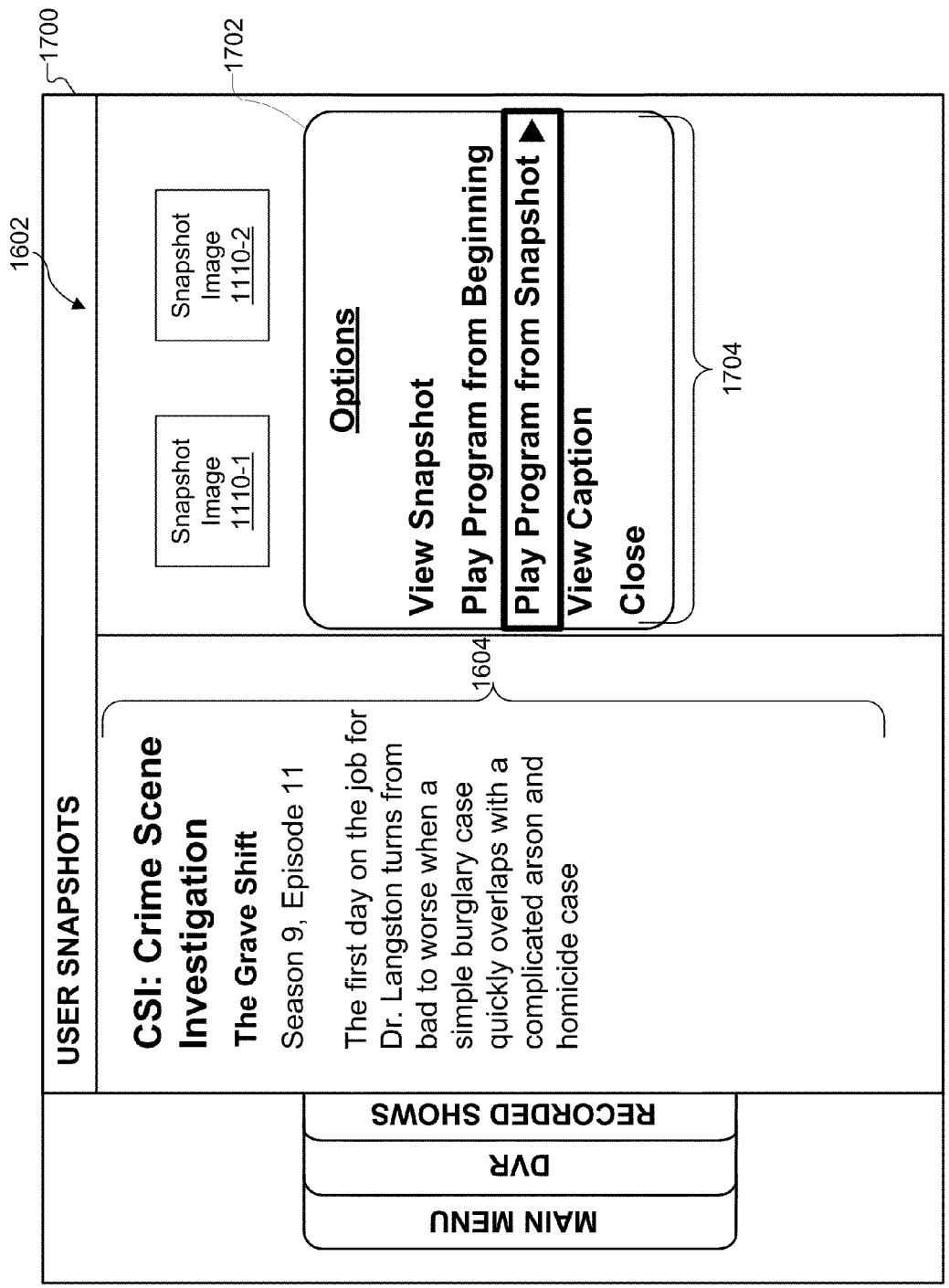
FIG. 17 illustrates a graphical user interface having exemplary selectable options associated with a selected snapshot image displayed therein.

In response to a user selection of one of the snapshot images 1608 (e.g., snapshot image 1608-1) displayed in user snapshots view 1602, access subsystem 104 may provide a chaptering options view for display. For example, FIG. 17 illustrates a GUI 1700 having an exemplary chaptering options view 1702 displayed therein. As shown in FIG. 17, chaptering options view 1702 may include a plurality of selectable options 1704 display therein. In the example illustrated in FIG. 17, the options 1704 include a "view snapshot" option, a "play program from beginning" option, a "play program from snapshot" option, a "view caption" option, and a "close" option. In response to a user selection of the "view snapshot" option, access subsystem 104 may provide a view of the selected snapshot image, such as an enlarged (e.g., full-screen) view of the snapshot image. In response to a user selection of the "play program from beginning" option, access subsystem 104 may initiate presentation of the media content program associated with the selected snapshot image from a beginning of the media content program. In response to a user selection of the "play program from snapshot" option, access subsystem 104 may initiate presentation of the media content program associated with the selected snapshot image from a position (e.g., a playback time) within the media content program, where the position is associated with the selected snapshot image. In response to a user selection of the "view caption" option, access subsystem 104 may provide a view of the caption associated with the selected snapshot image.

The exemplary options 1704 displayed in FIG. 17 are illustrative only. Other options for segment-based processing of a media content program may be provided in other embodiments.

In certain embodiments, an access subsystem 104 accessing chaptering data may be configured to provide one or more tools configured to enable a user 108 of access subsystem 104 to provide additional user input related to the chaptering data. For example, a comment tool may be provided and may be configured to facilitate a user 108 providing a comment related to chaptering data. For instance, a user 108 accessing a snapshot image 1608 may provide a comment about the snapshot image 1608 (e.g., "This scene is amazing!"). Comments related to a snapshot image may be transmitted to chaptering subsystem 103, which may associate and publish the comments with the snapshot image. Accordingly, system 100 may support discussion threads associated with chaptering data.

Communities of users 108 of access subsystems 104 may utilize the exemplary user-based media content chaptering systems and methods described above to provide and utilize media content chaptering data within the communities.

The exemplary systems and methods described herein may be implemented on one or more suitable media content distribution platforms. Accordingly, chaptering data such as media content snapshot images may be captured and provided via any suitable media content distribution platform and distributed via any suitable media content distribution platform. In certain embodiments, the exemplary systems and methods may be implemented within various media content platforms such that chaptering data may be received and distributed across various and/or diverse media content distribution platforms. Examples of media content distribution platforms may include, without limitation, subscriber television platforms, mobile phone platforms, the Internet, the World Wide Web, etc.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a media content access subsystem, a media content program for presentation to a user;
receiving, by said media content access subsystem, user input representing a selection of a snapshot image to be associated with a predefined chapter of said media content program;
capturing, by said media content access subsystem, said snapshot image based on said user input;
associating, by said media content access subsystem, metadata with said snapshot image;
transmitting, by said media content access subsystem, data representative of said snapshot image and said metadata to a media content chaptering subsystem for use by said media content chaptering subsystem in chaptering said media content program; and providing, by the media content access subsystem, said user with a publication setting selection tool configured for use by the user to create at least one group of users to whom permission to access said data representative of said snapshot image will be provided;

detecting, by another media content access subsystem, a user selection of said snapshot image displayed in a graphical user interface;

providing, by said another media content access subsystem, a plurality of selectable options for display in said graphical user interface in response to said user selection, said plurality of selectable options including an option to initiate playback of said media content program beginning at a playback time associated with said snapshot image; and initiating, by said another media content access subsystem, playback of said media content program beginning at said playback time associated with said snapshot image in response to a user selection of said option to initiate playback of said media content program beginning at said playback time associated with said snapshot image.

2. The method of claim 1, further comprising:
receiving, by said media content access subsystem, additional user input specifying a caption for said snapshot image;
associating, by said media content access subsystem, said caption with said snapshot image; and
transmitting, by said media content access subsystem, data representative of said caption to said media content chaptering subsystem for use in said chaptering of said media content program.

3. The method of claim 1, further comprising:
providing, by said media content access subsystem, a plurality of publication setting options to said user;
receiving, by said media content access subsystem, additional user input specifying a publication setting among the plurality of publication setting options for said snapshot image;
associating, by said media content access subsystem, said publication setting with said snapshot image; and
transmitting, by said media content access subsystem, data representative of said publication setting to said media content chaptering subsystem for use in publishing said snapshot image.

4. The method of claim 1, wherein said metadata comprises at least one of a timestamp indicating said playback time associated with said snapshot image, a user profile identifier indicative of said user, and a media content program identifier indicative of said media content program.

5. The method of claim 1, wherein said media content access subsystem comprises a set-top box.

6. The method of claim 1, tangibly embodied as computer-executable instructions on at least one non-transitory computer-readable medium.

7. The method of claim 2, further comprising providing a caption input tool in a graphical user interface, said caption input tool configured to facilitate said user providing said additional user input specifying said caption for said snapshot image.

8. The method of claim 3, wherein said publication setting selection tool is provided in a graphical user interface and is further configured to facilitate said user providing said additional user input specifying said publication setting for said snapshot image.

9. The method of claim 3, further comprising:
receiving, by said media content chaptering subsystem, said data representative of said snapshot image and said metadata;
storing, by said media content chaptering subsystem, said data representative of said snapshot image and said metadata to a storage device;
receiving, by said media content chaptering subsystem, a request for said snapshot image from said another media content access subsystem;
determining, by said media content chaptering subsystem, that said another media content access subsystem has permission to access said snapshot image based on said publication setting; and
transmitting, by said media content chaptering subsystem, data representative of said snapshot image to said another media content access subsystem in response to said request.

10. The method of claim 3, wherein said plurality of publication setting options includes an option to publish said snapshot image to the public, an option to publish said snapshot image to a private group, an option to publish said snapshot image to a private user, an option to publish said snapshot image to a social network, and an option to publish said snapshot image to a user created group.

11. The method of claim 9, further comprising:
receiving, by said another media content access subsystem, said data representative of said snapshot image; and
providing, by said another media content access subsystem, said snapshot image for display in a graphical user interface.

12. The method of claim 11, wherein said plurality of selectable options further includes an option to view a caption associated with said snapshot image, an option to initiate playback of said media content program beginning at a beginning of said media content program, and an option to view an enlarged representation of said snapshot image.

13. A method comprising:
maintaining, by a media content chaptering subsystem, a library of end-user-provided media content chaptering data, said end-user-provided media content chaptering data comprising a plurality of end-user-provided snapshot images associated with at least one predefined chapter of at least one media content program;
maintaining, by said media content chaptering subsystem, end-user-provided publication settings data for said end-user-provided media content chaptering data, said end-user-provided publications settings data including an end-user-created group of users to whom permission to access said end-user-provided media content chaptering data will be provided;
receiving, by said media content chaptering subsystem and from a media content access subsystem, a request for said end-user-provided media content chaptering data;
identifying, by said media content chaptering subsystem and based on said end-user-provided publication settings data, at least a subset of said requested end-user-provided media content chaptering data to which a user associated with said media content access subsystem has permission to access;
transmitting, by said media content chaptering subsystem, data representative of said at least a subset of said requested end-user-provided media content chaptering data to said media content access subsystem;
detecting, by said media content access subsystem, a user selection of one of said plurality of end-user provided snapshot images;

providing, by said media content access subsystem, a plurality of selectable options for display in a graphical user interface in response to said user selection, said plurality of selectable options including an option to initiate a playback of said media content program beginning at a playback time associated with said one of said plurality of end-user provided snapshot images; and initiating, by said media content access subsystem, said playback of said media content program beginning at said playback time associated with said one of said plurality of end-user provided snapshot images in response to a user selection of said option to initiate said playback of said media content program beginning at said playback time.

14. The method of claim 13, wherein said end-user-provided media content chaptering data further comprises metadata associated with said plurality of end-user-provided snapshot images.

15. The method of claim 13, wherein said maintaining of said library of said end-user-provided media content chaptering data comprises:

receiving said end-user-provided media content chaptering data from a plurality of media content access subsystems via a network; and aggregating said received end-user-provided media content chaptering data in said library of end-user-provided media content chaptering data.

16. The method of claim 13, further comprising:

receiving, by said media content access subsystem, said data representative of said at least a subset of said requested end-user-provided chaptering data; and providing, by said media content access subsystem, said at least a subset of said requested end-user-provided chaptering for display in said graphical user interface.

17. A system comprising:

a media content access subsystem that provides media content for presentation to an end user, captures media content chaptering data for said media content based on user input provided by said end user, said user input representing a selection of a snapshot image to be associated with a predefined chapter of said media content as media content chaptering data, captures publication settings data associated with said media content chaptering data based on additional user input provided by said end user, said additional user input provided by said end user including a creation of at least one group of users to whom permission to access said media content chaptering data will be provided, and transmits said media content chaptering data and said publication settings data over a network;

a media content chaptering subsystem that receives said media content chaptering data and said publication settings data from said media content access subsystem via said network, selectively publishes said media content chaptering data for access by one or more other media content access subsystems via said network based on said publication settings data;

wherein a media content access subsystem included in said one or more other media content access subsystems accesses said media content chaptering data for said media content via said network, detects a user selection of said snapshot image, provides a plurality of selectable options for display in a graphical user interface in response to said user selection, said plurality of selectable options including an option to initiate playback of said media content beginning at a playback time associated with said snapshot image, and initiates playback of said media content beginning at said playback time associated with said snapshot image in response to a user selection of said option to imitate playback of said media content beginning at said playback time associated with said snapshot image.

18. The system of claim 17, wherein said media content chaptering data further comprises a plurality of snapshot images of said media content and metadata associated with said plurality of snapshot images.

19. The system of claim 17, further comprising:

a media content delivery subsystem configured to transmit data representative of said media content over said network;

wherein said media content access subsystem and said one or more other media content access subsystems comprise a plurality of set-top boxes configured to receive said data representative of said media content from said media content delivery subsystem via said network.

20. The system of claim 18, wherein said metadata comprises playback times associated with said plurality of snapshots images.

* * * * *